United States Patent
Trivedi et al.

(10) Patent No.: US 12,045,564 B2
(45) Date of Patent: *Jul. 23, 2024

(54) BROWSER EXTENSION FOR FIELD DETECTION AND AUTOMATIC POPULATION

(71) Applicant: Capital One Services, LLC, McLean, VA (US)

(72) Inventors: Dwij Trivedi, Oakton, VA (US); Matthew de Ganon, Dobbs Ferry, NY (US); Kunal Arora, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,968

(22) Filed: Apr. 25, 2023

(65) Prior Publication Data

US 2023/0342546 A1    Oct. 26, 2023

Related U.S. Application Data

(63) Continuation of application No. 17/186,861, filed on Feb. 26, 2021, now Pat. No. 11,675,974, which is a
(Continued)

(51) Int. Cl.
*G06Q 20/12* (2012.01)
*G06F 16/957* (2019.01)
(Continued)

(52) U.S. Cl.
CPC .......... *G06F 40/221* (2020.01); *G06F 16/957* (2019.01); *G06F 40/174* (2020.01); *G06Q 20/12* (2013.01)

(58) Field of Classification Search
None
See application file for complete search history.

(56) References Cited

U.S. PATENT DOCUMENTS

2005/0257148 A1* 11/2005 Goodman ............. G06F 40/174
                                                       715/246
2007/0256005 A1* 11/2007 Schneider ............ G06F 40/134

OTHER PUBLICATIONS

"Fill Out Forms Automatically" Google Chrome Help, Apr. 20, 2010, https://support.google.com/chrome/answer/142893?co=GENIE.Platform%3DAndroid&hl=en (Year: 2010).*

* cited by examiner

*Primary Examiner* — David P Sharvin
(74) *Attorney, Agent, or Firm* — Perkins Coie LLP

(57) ABSTRACT

Methods and systems for a browser extension application are disclosed. In some embodiments, a browser extension application is configured to receive from a browser extension server a regular expression configured to detect a plurality of fields in a web page and execute the regular expression to detect a transaction field in the web page and automatically populate the transaction field with stored data. The application is further configured to detect an unrecognized field in the web page, provide suggested transaction data, and detecting manual population of the unrecognized field with the suggested transaction data. The application is further configured to providing to the browser extension server an indication of the unrecognized field and receive from the browser extension server an updated regular expression configured to detect the unrecognized field in the web page.

20 Claims, 18 Drawing Sheets

Related U.S. Application Data continuation of application No. 15/674,621, filed on Aug. 11, 2017, now Pat. No. 10,936,811, which is a continuation of application No. 15/669,396, filed on Aug. 4, 2017, now Pat. No. 10,169,321.

(60) Provisional application No. 62/371,276, filed on Aug. 5, 2016.

(51) Int. Cl.
*G06F 40/174* (2020.01)
*G06F 40/221* (2020.01)

BROWSER EXTENSION FOR FIELD DETECTION AND AUTOMATIC POPULATION

CROSS-REFERENCE TO RELATED APPLICATIONS

This application is a continuation of U.S. patent application Ser. No. 17/186,861, filed Feb. 26, 2021, which is a continuation of U.S. patent application Ser. No. 15/674,621, Aug. 11, 2017, which is a continuation of U.S. patent application Ser. No. 15/669,396, filed Aug. 4, 2017, which claims priority to U.S. Provisional Patent Application No. 62/371,276 filed Aug. 5, 2016. The contents of these applications are hereby incorporated by reference in their entirety.

BACKGROUND

Many users access information on the Internet using software applications known as web browser applications. Web browser applications interpret the various programming languages in which information on the Internet is written, such as hypertext markup language (HTML) or an extensible markup language (XML), to provide the information to users in a user-readable format.

Some web pages may include one or more fields requiring information to be entered by a user. For example, a web page through which a user can purchase a good or service may include one or more fields to be populated with data to identify the user and/or provide payment for the good. As another example, a web page through which a user can register for an event may include one or more fields to be populated to identify the user and/or a mailing address of the user.

Additional functionality may be added to web browsers by browser extension applications. A browser extension application is a software application made to be downloaded by a user and installed on the user's computing device to offer additional features to the browser. When the user accesses the Internet through a web browser application, the browser extension application may provide the user with additional functionality within the web browser application.

Some browser extension applications may be configured to automatically populate fields in a web page requiring population by a user. For example, a browser extension may be configured to automatically populate data identifying a user, providing payment, and/or providing a mailing address.

Due to the diversity of web pages, fields, and programming languages in which information on the Internet is written, however, typical browser extension applications may be unable to correctly identify fields requiring population in certain web pages. Moreover, as web pages are updated, fields may be changed, added, and/or removed from web pages. Typical browser extension applications may be unable to recognize and address such changes, additions, and removals.

When fields are incorrectly identified and/or populated by a browser extension application, subsequent correction by a user and/or the browser extension application may be required, resulting in inefficient communications, extra bandwidth consumption, and processor utilization. Moreover, for some web pages, such as dynamic web pages that actively communicate with a server providing the web page, such subsequent correction may result in inefficient communications, extra bandwidth consumption, and processor utilization on the server side as well, due to delays at the server caused by the corrections.

SUMMARY

The disclosed embodiments may include systems and methods for a browser extension for field detection and automatic population.

In one embodiment, a browser extension server is disclosed. The browser extension server may include a communication device configured to communicate with a computing device executing a browser extension application; a memory storing instructions; and a processor configured to execute the instructions to perform operations. The operations may include generating a regular expression configured to detect a plurality of fields in a web page; providing the regular expression to the browser extension application; receiving, from the browser extension application, an indication of an unrecognized field in the web-page based on an execution of the browser extension application by the computing device, the execution comprising using the regular expression to detect a transaction field in a web page; In response to the received indication of the unrecognized field, providing suggested transaction data to the browser extension application; receiving, from the browser extension application, an indication of detected manual population of the unrecognized field with the suggested transaction data; generating an updated regular expression configured to detect the unrecognized field in the web page based on the detected manual population; and providing the updated regular expression to the browser extension application.

In another embodiment, a method is disclosed. The method may include generating a regular expression configured to detect a plurality of fields in a web page; providing the regular expression to a browser extension application executed at a computing device; receiving, from the browser extension application, an indication of an unrecognized field in the web page based on an execution of the browser extension application by the computing device, the execution comprising using the regular expression to detect a transaction field in a web page; in response to the received indication of the unrecognized field, providing suggested transaction data to the browser extension application; receiving from the browser extension application an indication of detected manual population of the unrecognized field with the suggested transaction data; generating, based on the manual population, an updated regular expression configured to detect the unrecognized field in the web page; and providing the updated regular expression to the browser extension application.

In still another embodiments, a browser extension application configured to be executed at a computing device to perform operations. The operations include receiving from a browser extension server a regular expression configured to detect a plurality of fields in a web page; executing the regular expression to detect a transaction field in the web page and automatically populate the transaction field with stored data; detecting an unrecognized field in the web page; in response to detecting the unrecognized field, providing suggested transaction data; detecting manual population of the unrecognized field with the suggested transaction data; providing to the browser extension server an indication of the unrecognized fields; and receiving from the browser extension server an updated regular expression configured to detect the unrecognized field in the web page.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

The disclosed systems, methods, and computer-readable media include a browser extension application configured to identify fields requiring population in web pages. Unlike conventional browser extension applications, the disclosed browser extension application may, through iterative interaction with a browser extension server, be configured to recognize and automatically populate fields in web pages, including fields that have been altered, added to, or removed from the web pages. In these and other manners, the disclosed browser extension application represents an improvement over conventional browser extension applications. The disclosed browser extension application improves utilization of both processing and communications resources through the reduction of unintended errors in data submissions. Moreover, the improved automatic population enabled by the disclosed browser extension application may improve efficiency of web page population on the whole, thereby reducing or eliminating inefficient communications bandwidth consumption and processor utilization necessitated when a user incorrectly populates a field in a web page (e.g., through a misunderstanding or typographical error).

Figure 1:
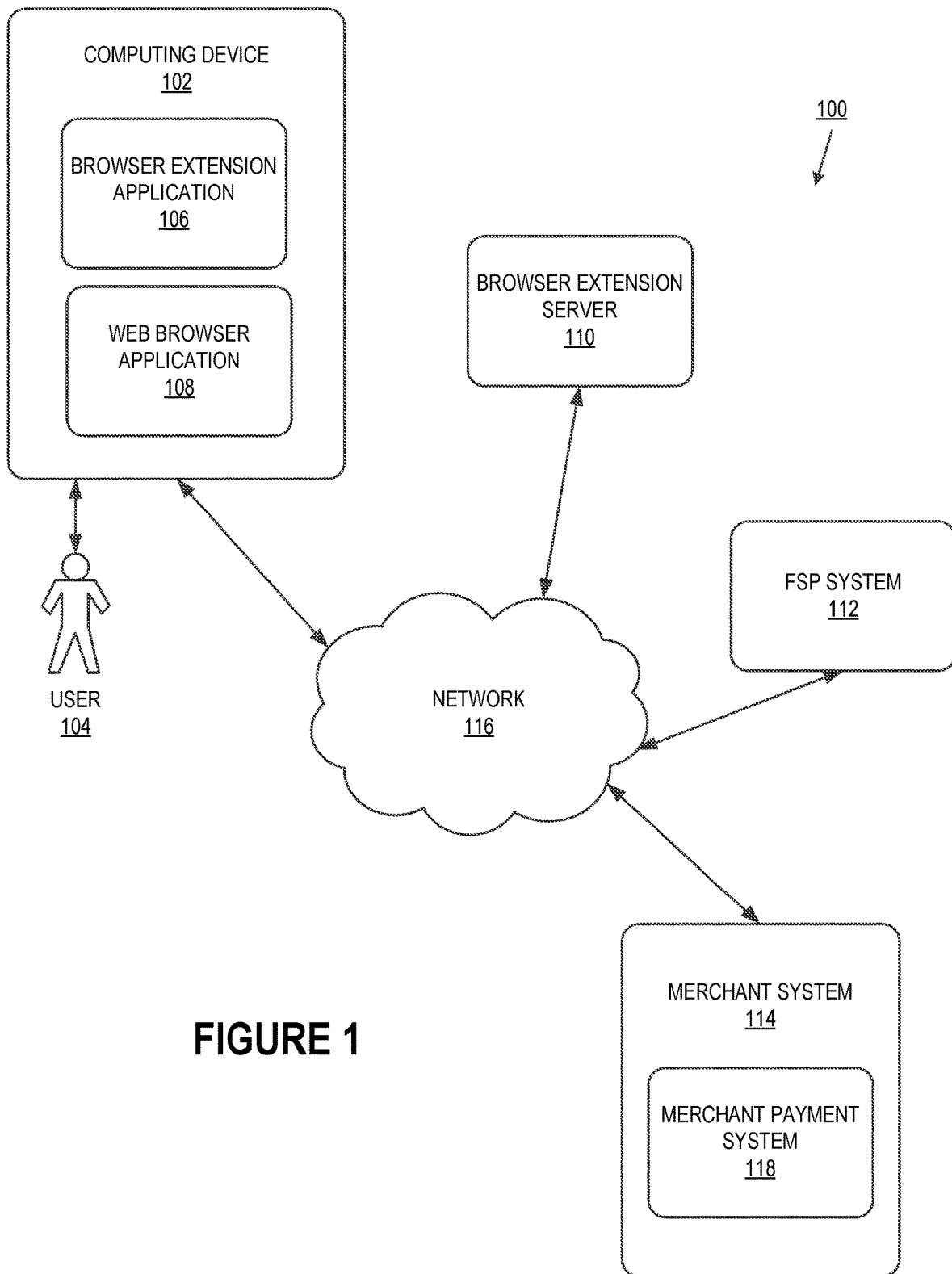
FIG. 1 is a block diagram of an exemplary system for field detection and automatic population, consistent with disclosed embodiments.

FIG. 1 is a block diagram of an exemplary system 100, consistent with disclosed embodiments. System 100 may be configured for performing a browser extension process consistent with disclosed embodiments.

As shown, system 100 may include a computing device 102 associated with a user 104. Computing device 102 may be configured to execute, among other programs, a browser extension application 106 and a web browser application 108. System 100 may further include a browser extension server 110, a financial service provider (FSP) system 112, and a merchant system 114. As shown, computing device 102, browser extension server 110, FSP system 112, and merchant system 114 may be communicatively coupled by a network 116.

While only one computing device 102, browser extension server 110. FSP system 112, merchant system 114, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Computing device 102 may be one or more computing devices configured to perform operations consistent with executing browser extension application 106 and with executing web browser application 108. Computing device 102 is further described below in connection with FIG. 3.

Browser extension application 106 may be one or more software applications configured to perform operations consistent with detecting and/or automatically populating fields in web pages, such as transaction fields in web pages associated with merchants. For example, browser extension application 106 may be configured to automatically populate detected transaction fields in web pages with stored transaction data associated with user 104 and/or computing device 102. Alternatively or additionally, browser extension application 106 may be configured to automatically populate detected transaction fields in web pages with secure tokens, virtual account numbers, or other payment data mapped to financial service accounts associated with user 104 and/or computing device 102.

In some embodiments, browser extension application 106 may detect and/or automatically populate transaction fields in web pages using, for example, one or more regular expressions. A regular expression may be defined as a sequence of characters that defines a search pattern. Example regular expressions may include, for instance, RegExp, RegEx, or POSIX regular expressions. Other regular expressions are possible as well.

In some embodiments, a regular expression may be configured for use in searching web pages according to the search pattern to detect elements such as, for example, transaction fields and/or additional elements in the web pages. In some embodiments, a regular expression may be configured for use in detecting, for example, transaction fields and/or additional elements in programming language used to create the web pages, such as hypertext markup language (HTML) or extensible markup language (XML). For example, transaction fields and/or additional elements may be detected based on "ID" and/or "NAME" attributes for fields within the programming language.

Web browser application 108 may be one or more software applications configured to perform operations consistent with providing web pages, such as web pages associated with merchants. The web pages may include transaction fields. Web browser application 108 is further described below in connection with FIG. 3.

Browser extension server 110 may be one or more computing devices configured to perform operations consistent with providing browser extension application 106. Browser extension server 110 may be further configured to perform operations consistent with generating regular expressions for use by browser extension application 106 in detecting and/or populating transaction fields in web pages. Alternatively or additionally, browser extension server 110 may be further configured to perform operations consistent with generating secure tokens, virtual account numbers, or other payment data mapped to financial service accounts. Browser extension server 110 is further described below in connection with FIG. 2.

FSP system 112 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 112 may be one or more computing devices configured to perform operations consistent with maintaining financial service accounts, including a financial service account associated with user 104. FSP system 112 may be further configured to authenticate financial transactions associated with such financial service accounts. In particular, FSP system 112 may be configured to authenticate financial transactions associated with a financial service account associated with user 104. In some embodiments, FSP system 112 may be further configured to generate content for a display device included in, or connected to, computing device 102, such as through a mobile banking or other application on computing device 102. Alternatively or additionally, FSP system 112 may be configured to provide content through one or more web pages or online portals that are accessible by computing device 102 over network 116. The disclosed embodiments are not limited to any particular configuration of FSP system 112.

While browser extension server 110 and FSP system 112 are shown separately, in some embodiments browser extension server 110 may include or be otherwise related to FSP system 112. For example, in some embodiments the facility of browser extension server 110 may be provided instead by FSP system 112, or vice versa. Alternatively or additionally, in some embodiments, browser extension server 110 may be included in, and/or be otherwise related to, any other entity in system 100 and/or a third-party not shown in system 100. Alternatively or additionally, browser extension server 110 may be a standalone server. Browser extension server 110 may take other forms as well.

Merchant system 114 may be one or more computing devices configured to perform operations consistent with providing web pages that are accessible by computing device 102 over network 116. For example, the web pages may be provided at computing device 102 through web browser application 108. In some embodiments, merchant system 114 may be associated with a merchant that provides goods or services. Further, in some embodiments, the web pages may be online retail web pages through which user 104 may engage in purchase transactions to purchase the merchant's goods or services. Other web pages are possible as well. The disclosed embodiments are not limited to any particular configuration of merchant system 114.

In some embodiments, merchant system 114 may include a merchant payment system 118. Merchant payment system 118 may be one or more computing devices configured to perform operations consistent with providing, within the web pages provided by merchant system 114, a merchant-provided payment process through which user 104 may engage in purchase transactions to purchase the merchant's goods or services. In some embodiments, merchant payment system 118 may be provided by the merchant in connection with one or more financial service providers, such as the financial service provider associated with FSP system 112 or another financial service provider. The payment process may, for example, be the same as or similar to MasterPass™, PayPal®, or Visa® Checkout. Other payment processes are possible as well.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
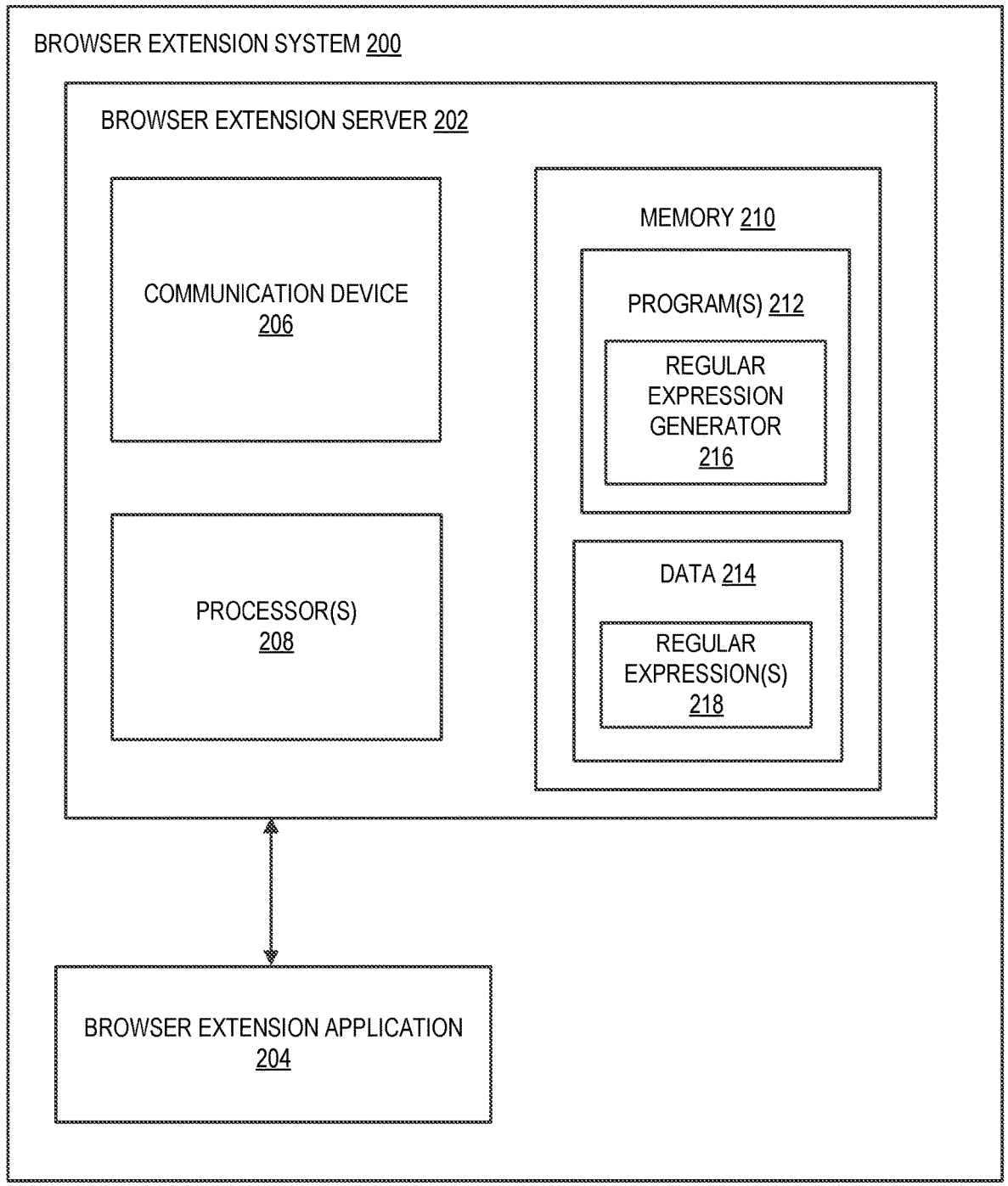
FIG. 2 is a block diagram of an exemplary browser extension system, consistent with disclosed embodiments.

FIG. 2 is a block diagram of an exemplary browser extension system 200, consistent with disclosed embodiments. As shown, browser extension system 200 may include browser extension server 202 and browser extension application 204. Browser extension server 202 may include a communication device 206, one or more processor(s) 208, and memory 210 including one or more programs 212 and data 214. Browser extension server 202 may be configured to perform operations consistent with providing browser extension application 204.

Browser extension server 202 may take the form of a server, general purpose computer, mainframe computer, or any combination of these components. Other implementations consistent with disclosed embodiments are possible as well. Browser extension application 204 may take the form of one or more software applications stored on a computing device, such as browser extension application 106 stored on computing device 102 described above.

Communication device 206 may be configured to communicate with one or more computing devices, such as computing device 102. In some embodiments, communication device 206 may be configured to communicate with the computing device(s) through browser extension application 204. Browser extension server 202 may, for example, be configured to provide to browser extension application 204 one or more regular expressions through communication device 206. As another example, browser extension server 202 may be configured to receive from browser extension application 204 one or more indications of unrecognized fields in web pages provided by the computing device(s) through communication device 206. Communication device 206 may be configured to communicate other information as well.

Communication device 206 may be further configured to communicate with one or more FSP systems, such as FSP system 112 described above. In some embodiments, the FSP system may provide a financial service account associated with a computing device, and communication device 206 may be configured to communicate with the FSP system(s) to generate a secure token mapped to the financial service account associated with the computing device. Communication device 206 may be configured to communicate with the FSP system(s) in other manners. Communication device 206 may be configured to communicate with other components as well.

Processor(s) 208 may include one or more known processing devices, such as a microprocessor from the Core®, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of browser extension system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. The disclosed embodiments are not limited to separate programs or computers configured to perform dedicated tasks. For example, memory 210 may include a single program 212 that performs the functions of browser extension system 200, or program(s) 212 may comprise multiple programs. Memory 210 may also store data 214 that is used by program(s) 212.

In certain embodiments, memory 210 may store sets of instructions for carrying out the processes described below in connection with FIGS. 4A-4B. Other instructions are possible as well. In general, instructions may be executed by processor(s) 208 to perform one or more processes consistent with disclosed embodiments. In some embodiments, program(s) 212 may include a regular expression generator 216 configured to generate and/or update one or more regular expressions 218 for use by browser extension application 204 in detecting and/or automatically populating fields in web pages. The regular expression(s) 218 may be stored in memory 210.

The components of browser extension system 200 may be implemented in hardware, software, or a combination of both hardware and software, as will be apparent to those skilled in the art. For example, although one or more components of browser extension system 200 may be implemented as computer processing instructions, all or a portion of the functionality of browser extension system 200 may be implemented instead in dedicated electronics hardware.

In some embodiments, browser extension system 200 may also be communicatively connected to one or more database(s) (not shown). Alternatively, such database(s) may be located remotely from browser extension system 200. Browser extension system 200 may be communicatively connected to such database(s) through a network, such as network 116 described above. Such database(s) may include one or more memory devices that store information and are accessed and/or managed through browser extension system 200. In some embodiments, one or both of regular expression generator 216 and regular expression(s) 218 may be implemented with a database(s). By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

Figure 3:
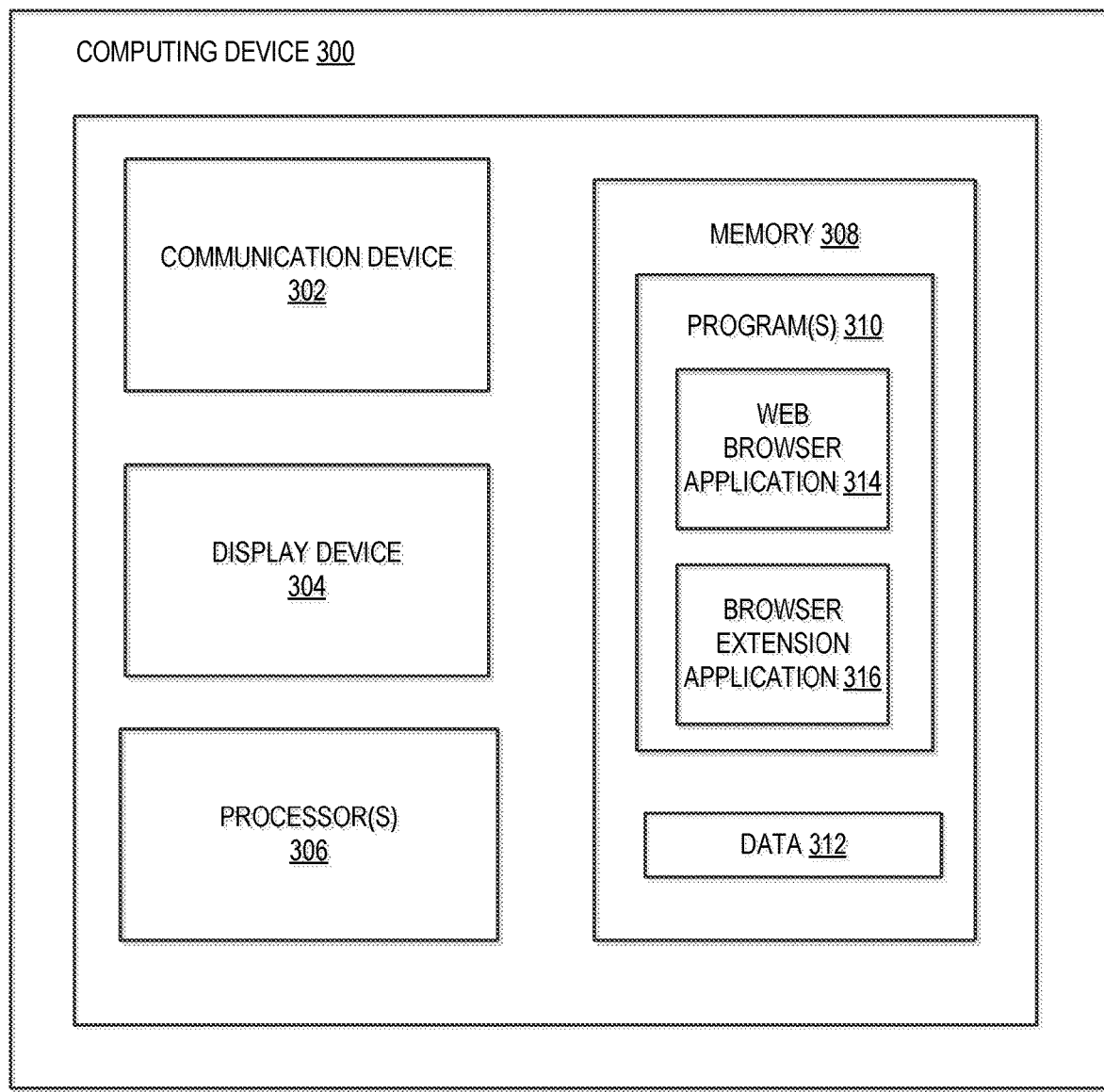
FIG. 3 is a block diagram of an exemplary computing device, consistent with disclosed embodiments.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, web browser application 314 and browser extension application 316.

In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a user's person. Other implementations consistent with disclosed embodiments are possible as well, Computing device 300 may, for example, be the same as or similar to computing device 102 described above.

Communication device 302 may be configured to communicate with a browser extension server, such as browser extension servers 110 and 202 described above. In some embodiments, communication device 302 may be further configured to communicate with one or more merchant systems, such as merchant system 114 described above, and/or one or more FSP systems, such as FSP system 112 described above. Communication device 302 may be configured to communicate with other components as well.

Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 116. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones.

Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out the processes described below in connection with FIG. 4C. Other instructions are possible as well. In general, instructions may be executed by processor(s) 306 to perform one or more processes consistent with disclosed embodiments.

In some embodiments, program(s) 310 may include web browser application 314. Web browser application 314 may be executable by processor(s) 306 to perform operations including, for example, providing web pages for display. The web pages may be provided, for example, via display device 304. In some embodiments, the web pages may be associated with a merchant system, such as merchant system 114 described above. Web browser application 314 may be executable by processor(s) 306 to perform other operations as well.

In some embodiments, program(s) 310 may further include a browser extension application 316. Browser extension application 316 may, for example, be the same as similar to browser extension applications 106 and 204 described above. Browser extension application 316 may be executable by processor(s) 306 to perform various operations including, for example, detecting and automatically populating transaction fields in web pages provided by computing device 300 through web browser application 314. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4A:
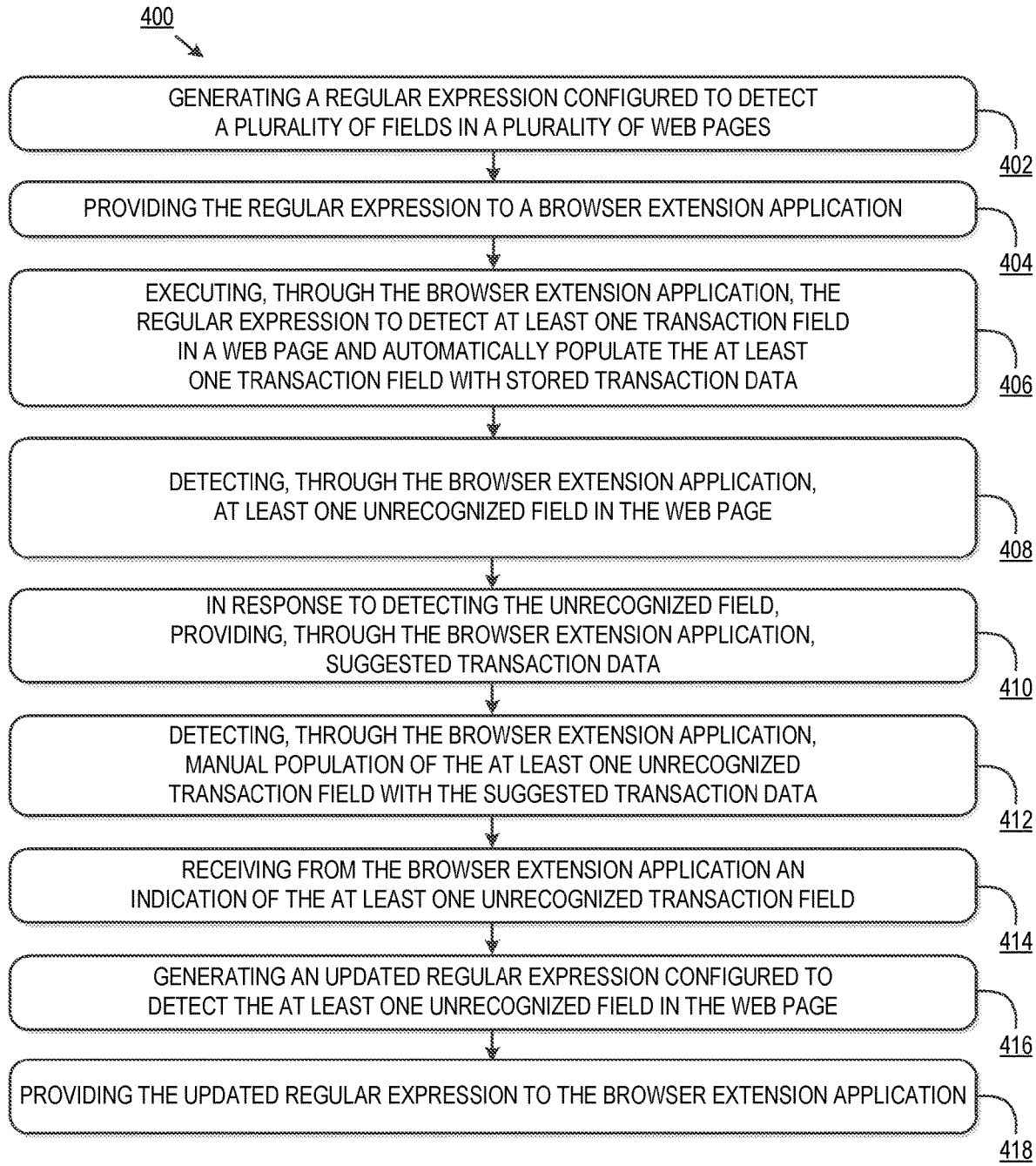
FIGS. 4A-4C are flowcharts of exemplary browser extension processes, consistent with disclosed embodiments.

FIG. 4A is a flowchart of an exemplary browser extension process 400, consistent with disclosed embodiments. Browser extension process 400 may be carried out by a browser extension server, such as browser extension servers 110 and 202 described above, in connection with a browser extension application, such as browser extension applications 106, 204, and 316 described above.

In some embodiments, browser extension process 400 may include, at step 402, generating a regular expression configured for use in detecting one or more fields in one or more web pages. The regular expression may take any of the forms described above. Generating a regular expression is further described in connection with FIG. 4B.

Figure 4B:
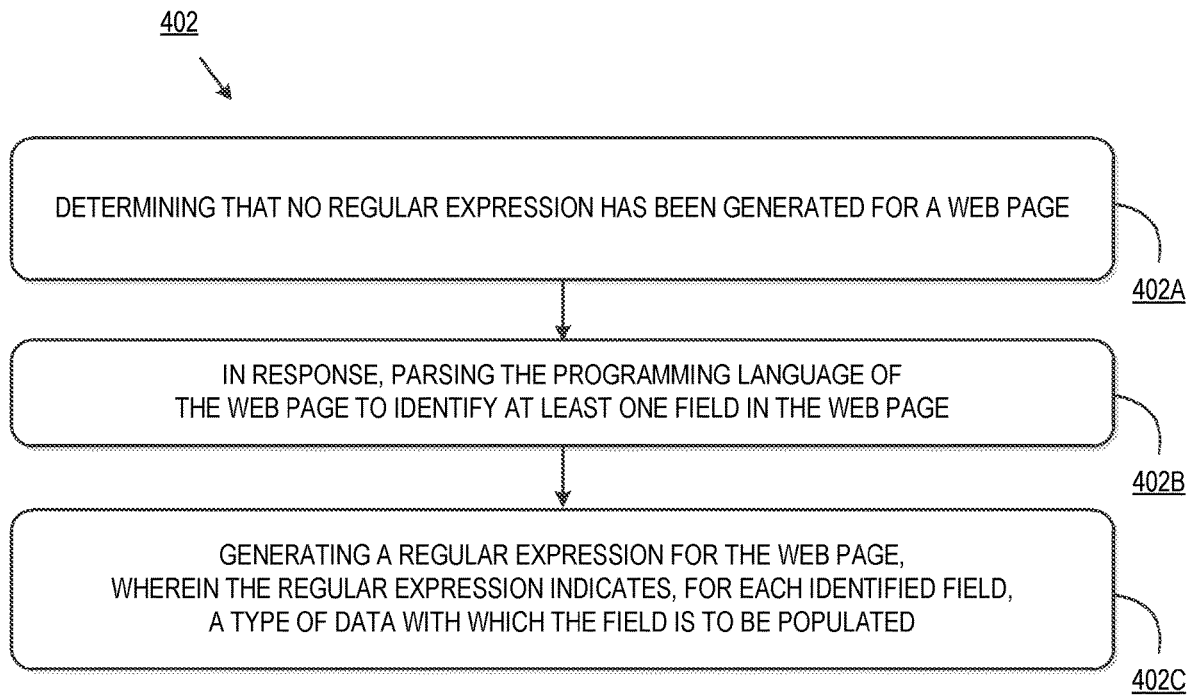

As shown in FIG. 4B, step 402 may involve determining that no regular expression has been generated for a web page at sub-step 402A. The web page may be, for example, a web page provided in a browser application executed at a client device, and a browser extension application executed at the client device may seek a regular expression from the browser extension server for the web page. As another example, the web page may be a web page identified by browser extension server, e.g., through a browse, sweep, crawl, or search of the Internet. As still another example, the web page may be a web page associated with a merchant system or other third-party, and the merchant or other third-party may provide the web page to the browser extension server.

In any case, the browser extension server may determine that no previously generated regular expression is available for the web page. For example, the browser extension server may search and/or provide a query to data storage and/or a database associated with the browser extension server to determine whether a regular expression for the web page is stored there. In some embodiments, the browser extension server may determine that no regular expression has been generated for the web page when no regular expression for the web page can be found in the data storage and/or database.

At sub-step 402B, in response to determining that no regular expression has been generated for the web page, the browser extension server may parse a programming language in which the web page is written to identify at least one field in the web page. For example, the browser extension server may review the language of the web page to identify patterns indicative of fields. In some embodiments, browser extension server may maintain and/or may access a number of predetermined patterns indicative of fields. The predetermined patterns may include alphanumeric patterns, data patterns, field type patterns, and/or data type patterns. The browser extension server may, for example, compare the predetermined patterns to the web page in order to identify the field(s) in the web page. In some embodiments, identifying the field(s) may involve identifying a location of the field(s) within the web page as well as a field type and/or data type for use in populating the field.

At sub-step 402C, the browser extension server may generate a regular expression for the web page. The regular expression may indicate the identified fields. Further, the regular expression may indicate, for each identified field, a type of data with which the field is to be populated. The generated regular expression may be stored in the data storage and/or the database.

Returning to FIG. 4A, in some embodiments, browser extension process 400 may include, at step 404, providing the regular expression to a browser extension application, such as browser extension applications 106, 204, and 316 described above. The browser extension application may be, for example, executed at a computing device, such as computing devices 102 and 300 described above.

In some embodiments, browser extension process 400 may include, at step 406, executing the browser extension application to detect at least one transaction field in a web page based on the regular expression and automatically populate the at least one transaction field with stored transaction data.

The web page may be, for example, a web page provided by the computing device through a web browser application, such as web browser applications 108 and 314 described above. Detecting the transaction field(s) may involve, for example, detecting patterns within the HTML or XML used to create the web page. Transaction fields may be detected in other manners as well.

The transaction field(s) may include, for example, any field provided in the web page into which a user of the computing device may enter information, such as a text box, a drop-down menu, or any other visual or textual selection or input element in the web page. Example transaction fields may include, for instance: account fields into which a user may input account information, preferences fields into which auser may input preferences for an account, payment fields into which a user may input payment information for a purchase transaction, shipping fields into which a user may input shipping information for a purchase transaction, and/or preferences fields into which a user may input preferences for a purchase transaction. Other transaction fields are possible as well.

In some embodiments, the web browser application may execute the regular expression to detect at least one additional element in the web pages. The additional element may include any element in the web page. Example elements may include, for instance: titles, descriptions, images, headers, and objects in the web page. Other elements are possible as well.

In some embodiments, the web browser application may automatically populate the at least one transaction field with stored transaction data. The stored transaction data may be any data associated by the user and maintained by the browser extension application and/or the browser extension server. Example stored transaction data may include, for instance: account data, such as login credentials and/or account preferences, payment data, such as data associated with a financial service product (e.g., credit card or debit card) or financial service account, and shipping data, such as a shipping address and/or shipping preferences. Other stored transaction data is possible as well.

In some embodiments, the stored transaction data may be associated with a computing device executing the browser extension application and/or a user of the computing device. Alternatively or additionally, in some embodiments the stored transaction data may be stored at the computing device or at the browser extension server. Still alternatively or additionally, in some embodiments the stored transaction data may be received from a user of the computing device through the computing device and/or another device. The stored transaction data may take other forms as well.

In some embodiments, the browser extension application may, prior to automatically populating the detected at least one transaction field, authenticate a user of the computing device. The browser extension application may authenticate the user by, for example, receiving login credentials from the user, such as a username and password. In some embodiments, once the browser extension application has authenticated the user, the browser extension application may maintain a login state for the user during a predetermined timeout period, such that the user need not be authenticated each time the browser extension application is used during the predetermined timeout period.

In some embodiments, the browser extension application may seek confirmation of the automatically populated stored transaction data from, for example, a user of the computing device. Alternatively or additionally, the browser extension application may be configured to receive from a user updates and/or changes to the stored transaction data. In some embodiments, the browser extension application may be configured to update and/or change the stored transaction data in response to such an update and/or change from the user.

By automatically populating the detected at least one transaction field, the browser extension application may improve efficiency of web page population on the whole, thereby reducing or eliminating inefficient communications, bandwidth consumption, and processor utilization necessitated when a user incorrectly populates a field in the web page (e.g., through a misunderstanding or typographical error) and must replace or re-enter information in the field, requiring the replacement information to be retransmitted and reprocessed.

In some embodiments, browser extension process 400 may include, at step 408, detecting, through the browser extension application, at least one unrecognized field in the web page. The unrecognized field may be any field for which, through execution of the regular expression, the browser extension application is unable to recognize a field type (e.g., the nature of the field) and/or data type (e.g., the type of information the field is intended to receive). In some embodiments, the at least one unrecognized field may include a transaction field. Alternatively or additionally, in some embodiments the at least one unrecognized field may include an additional element in the web page. The unrecognized field may take other forms as well.

In some embodiments, browser extension process 400 may include, at step 410, in response to detecting the unrecognized field, providing, through the browser extension application, suggested transaction data. In some embodiments, the suggested transaction data may be, for example, stored transaction data, and may take any of the forms described above for stored transaction data. In some embodiments, for example, the suggested transaction data may include stored transaction data not used to automatically populate a detected transaction field. Alternatively or additionally, the suggested transaction data may include data having a data type and/or field type compatible with the field. For example, for an unrecognized field compatible with a data type specifying a five digit numeric input, the suggested transaction data may include zip code data. As another example, for an unrecognized field compatible with a data type specifying an alphanumeric string, the suggested transaction data may include a name or address.

In some embodiments, providing the suggested transaction data may involve, for example, displaying one or more prompts, such as a pop-up notification or other graphical indication, that includes the suggested transaction data. Alternatively or additionally, in some embodiments providing the suggested transaction data may involve, for instance, providing an option for a user of the computing device to copy some or all of the suggested transaction data. The suggested transaction data may be provided in other manners as well.

In some embodiments, browser extension process 400 may include, at step 412, detecting, through the browser extension application, manual population of the at least one unrecognized field with the suggested transaction data. In some embodiments, the manual population may include, for example, a user pasting the suggested transaction data into the at least one unrecognized field. Detecting the manual population may involve, for example, detecting which suggested transaction data was populated into an unrecognized field. The manual population may be detected in other manners as well.

In some embodiments, browser extension process 400 may further include associating the at least one unrecognized field with a field type based on the manual population. In some embodiments, browser extension server may make the association based on information received from a computing device executing the browser extension application. Alternatively or additionally, the computing device may determine the association and provide it to the browser extension server, as discussed below.

In some embodiments, an unrecognized field may then become recognized based on, for example, the suggested transaction data that was manually populated into the unrecognized field. For example, if the suggested transaction data that was manually populated into the unrecognized field was a ZIP™ code, the unrecognized field may become recognized as a ZIP code field, which may, for example, be part of a shipping address. As another example, if the suggested transaction data that was manually populated into the unrecognized field was a routing number, the unrecognized field may become recognized to be a routing number field, which may, for example, be part of payment information. Other examples are possible as well.

In some embodiments, browser extension process 400 may include, at step 414, receiving from the browser extension application an indication of the at least one unrecognized field. The indication may describe, for example, the unrecognized field, the suggested transaction data that was manually populated into the unrecognized field, and/or association data associating the unrecognized field with field type(s) based on the manual population. For example, if the unrecognized field becomes recognized as a ZIP code field, the indication may describe the unrecognized field, that the unrecognized field became recognized as a ZIP code field, and/or the ZIP code that was manually populated into the field. As another example, it the unrecognized, field becomes recognized as a routing number, the indication may describe the unrecognized field, that the unrecognized field was recognized to be a routing number, and/or the routing number that was manually populated into the field. Other examples are possible as well.

In some embodiments, the browser extension server may receive, from the browser extension application, programming language describing the web page. The programming language may, for example, describe the unrecognized field. Alternatively or additionally, the programming language may, for example, describe one or more additional elements in the web page. The additional elements may take any of the forms described above. The programming language may be any language used to create a web page. In some embodiments, the programming language may be HTML or XML. Other programming languages are possible as well. The programming language may be received together with and/ or separately from the indication of the unrecognized field. In some embodiments, the unrecognized field may be indicated using, for example, "ID" and/or "NAME" attributes for fields within the programming language.

In some embodiments, browser extension process 400 may include, at step 416, generating an updated regular expression configured to detect the at least one unrecognized field in the web page. The updated regular expression may be generated based on, e.g., the association data. The updated regular expression may be configured to detect a plurality of fields in a web page, including the at least one unrecognized field in the web page. In some embodiments, the updated regular expression may include an updated sequence of characters or search pattern. The updated regular expression may take other forms as well.

In some embodiments, the updated regular expression may be generated in response to receiving the indication from the browser extension application. Alternatively, in some embodiments the updated regular expression may be generated in response to receiving a query from the computing device through the browser extension application, such as a query for an updated regular expression. Still alternatively, in some embodiments, the updated regular expression may be generated according to a periodic schedule. For example, the browser extension server may generate regular expressions periodically, and the updated regular expression may be generated as a subsequent periodic generation. The updated regular expression may be generated in other manners as well.

In some embodiments, browser extension process 400 may include, at step 418, providing the updated regular expression to the browser extension application. Upon execution, the updated regular expression may enable the browser extension application to detect and recognize previously unrecognized field(s). In some embodiments, the updated regular expression may be provided in response to receiving the indication from the browser extension application. Alternatively. In some embodiments the updated regular expression may be provided in response to receiving a query from the computing device through the browser extension application, such as a query for an updated regular expression. Still alternatively, in some embodiments, the updated regular expression may be provided according to a periodic schedule. For example, the browser extension server may provide regular expressions to the browser extension application periodically, and the updated regular expression may be provided as a subsequent periodic provision. The updated regular expression may be provided in other manners as well.

By providing the updated regular expression to the browser extension application, the browser extension server may improve the ability of the browser extension application to correctly automatically populate fields in the web page. In this manner, the updated regular expression may permit the browser extension application to reduce or eliminate inefficient communications, bandwidth consumption, and processor utilization necessitated at the device and at the server providing the web page when conventional browser applications incorrectly identify and/or populate fields in web pages.

Figure 4C:
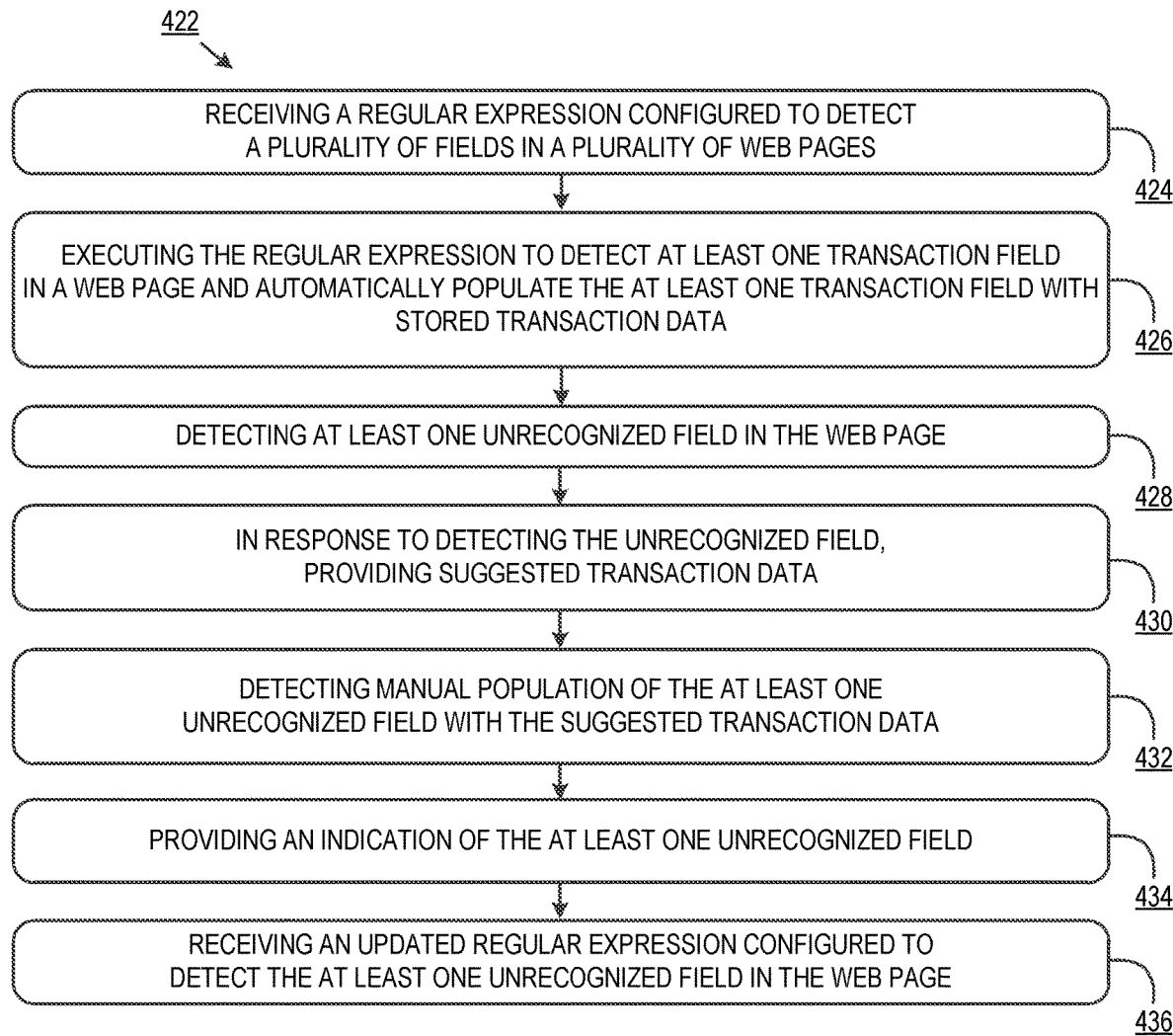

FIG. 4C is a flowchart of an exemplary browser extension process 422, consistent with disclosed embodiments. Browser extension process 422 may be carried out by a browser extension application, such as browser extension applications 106, 204, and 316 described above, in connection with a browser extension server, such as browser extension servers 110 and 202 described above. The browser extension application may be executed at, for example, a computing device, such as computing devices 102 and 300 described above.

In some embodiments, browser extension process 422 may include, at step 424, receiving a regular expression configured to detect one or more fields in one or more web pages. The regular expression may be received from, for example, the browser extension server. The regular expression may take any of the forms described above.

In some embodiments, browser extension process 422 may include, at step 426, executing the regular expression to detect at least one transaction field in a web page and automatically populate the at least one transaction field with stored transaction data. In some embodiments, the web page may be, for example, a web page provided by a web browser application executed at the computing device. The transaction fields and the stored transaction data may take any of the forms described above.

By automatically populating the detected at least one transaction field, the browser extension application may improve efficiency of web page population on the whole, thereby reducing or eliminating inefficient communications, bandwidth consumption, and processor utilization necessitated when a user incorrectly populates a field in the web page (e.g., through a misunderstanding or typographical error) and must replace or re-enter information in the field.

In some embodiments, browser extension process 422 may include, at step 428, detecting at least one unrecognized field in the web page. The unrecognized field may be any field that, through execution of the regular expression, the browser extension application is unable to recognize.

In some embodiments, browser extension process 422 may include, at step 430, in response to detecting the unrecognized field, providing suggested transaction data. The suggested transaction data may take any of the forms described above and may be provided in any of the manners described above.

In some embodiments, browser extension process 422 may include, at step 432, detecting manual population of the at least one unrecognized field with the suggested transaction data. In some cases, the browser extension process 422 may further include, based on the manual population, associating the at least one unrecognized field with a field type. As discussed above, alternatively or additionally, the association may be made at browser extension server. The manual population may take any of the forms described above, and the manual population and the recognition may be performed in any of the manners described above.

In some embodiments, browser extension process 422 may include, at step 434, providing an indication of the at least one unrecognized field. The indication may be provided to, for example, the browser extension server. In some embodiments, browser extension process 422 may include, at step 436, receiving an updated regular expression configured to detect and recognize the at least one unrecognized field in the web page. The updated regular expression may take any of the forms described above. In some embodiments, the updated regular expression may be received from, for example, the browser extension server. In some embodiments, the browser extension application may be further configured to detect a "Checkout" stage of a purchase transaction, such as a "Shopping Cart" or page in which a purchase transaction may be completed. In some embodiments, in response to detecting the "Checkout" stage, the browser extension application may prompt the user to employ the browser extension application in making the purchase transaction.

While methods 400 and 422 described a single regular expression and a single updated regular expression, it will be understood that, in some embodiments, browser extension server may generate more than one regular expression and/or updated regular expression, and browser extension application may be configured to execute more than one regular expression and/or updated regular expression. In some embodiments, more than one regular expression may be used to detect and/or automatically populate transaction fields in a web page.

Figure 5A:
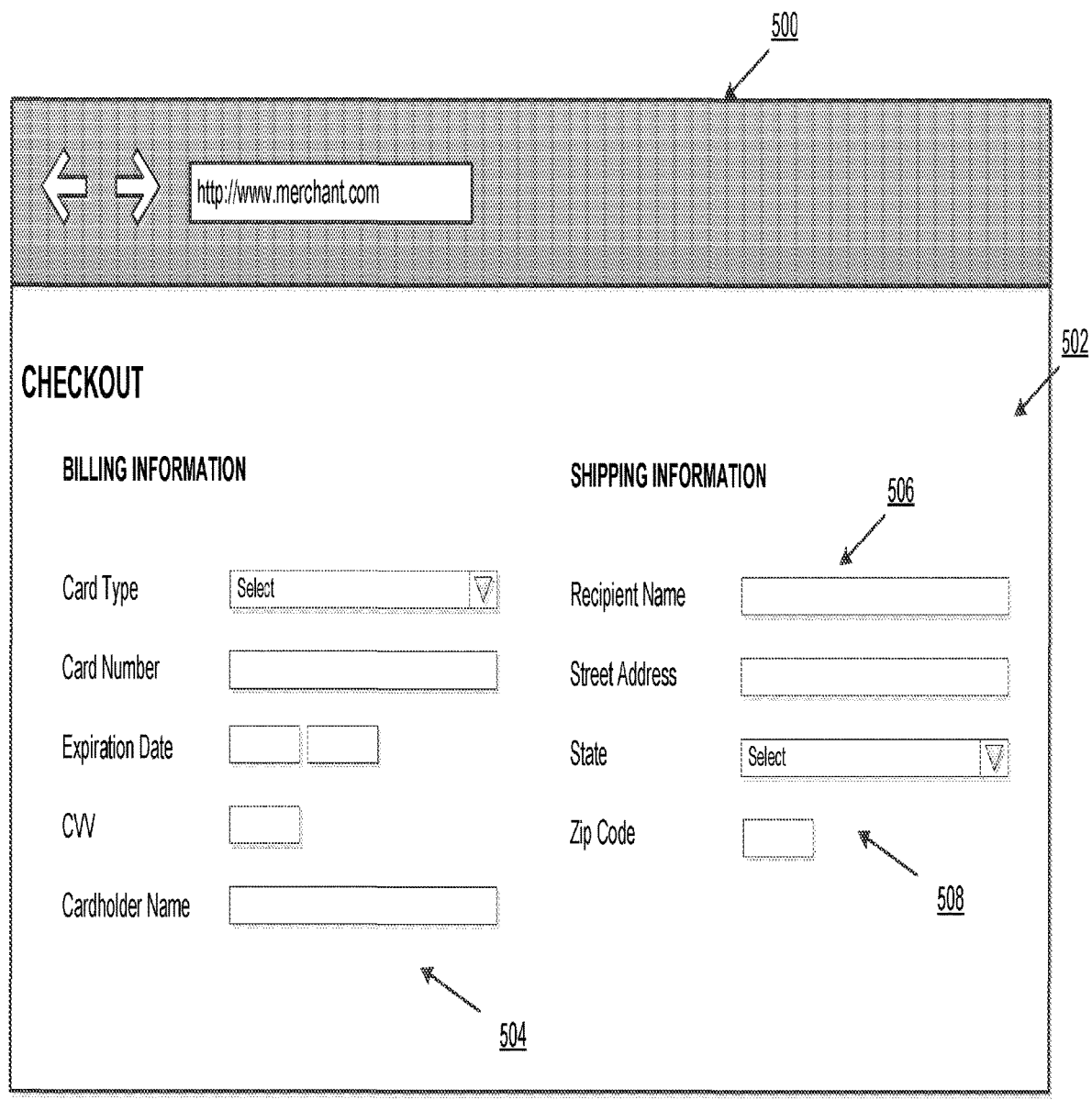
FIGS. 5A-5C illustrate exemplary interfaces on computing devices, consistent with disclosed embodiments.
Figure 5B:
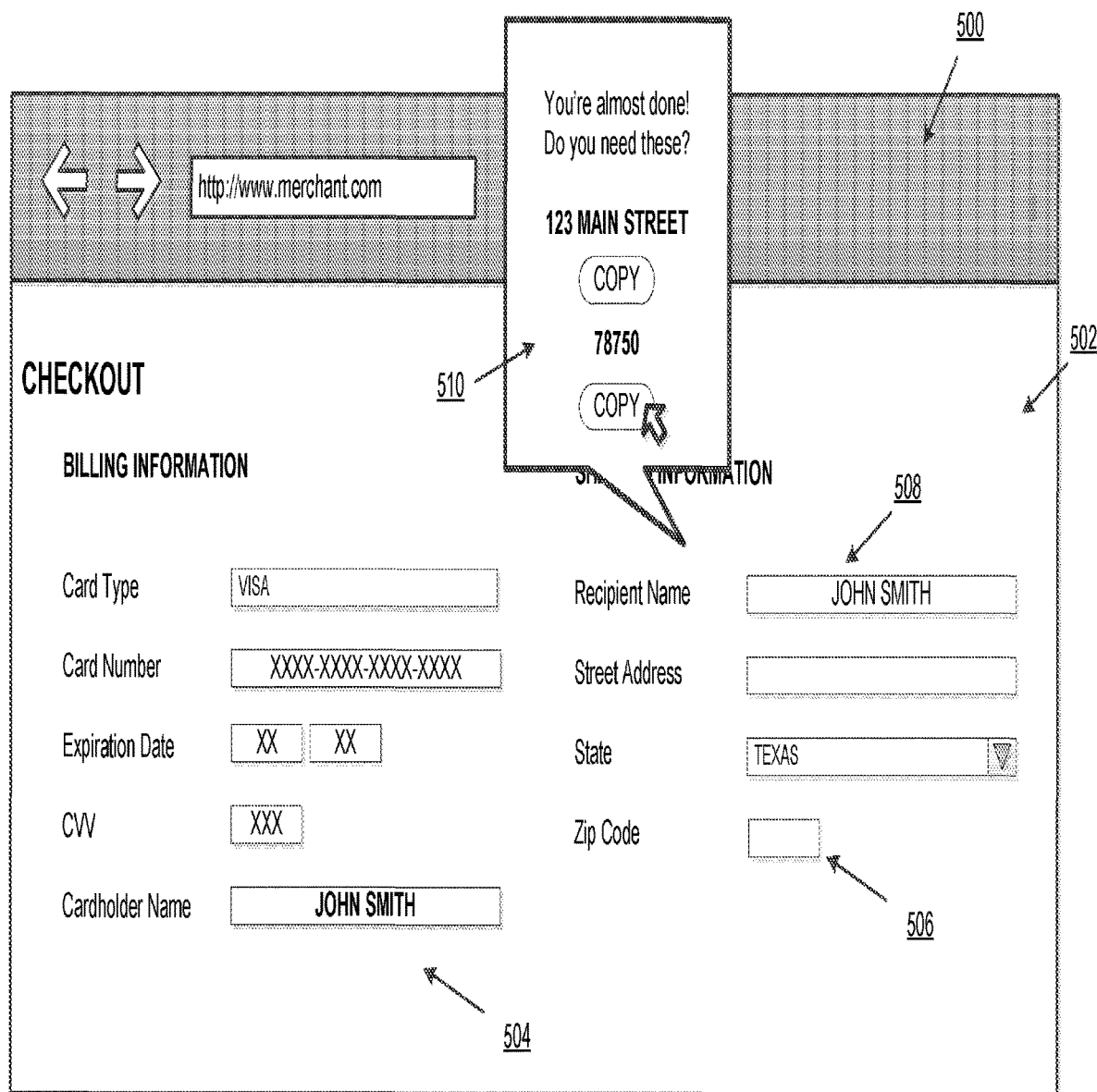
Figure 5C:
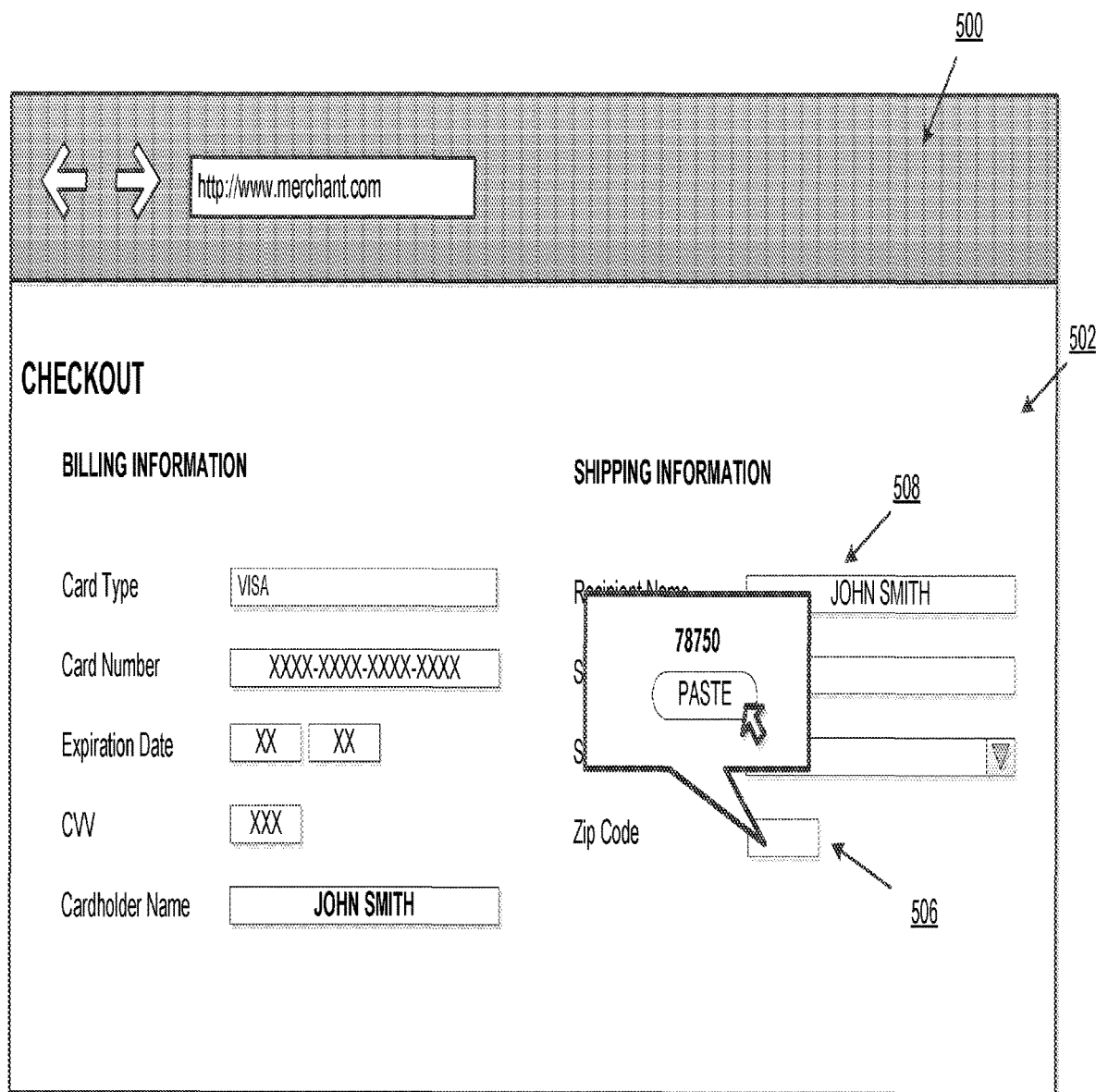

FIGS. 5A-5C illustrate exemplary interfaces on computing devices, consistent with disclosed embodiments. In some embodiments, as shown in FIG. 5A, a computing device, such as computing devices 102 and 300 described above, may be configured with a web browser application 500, such as web browser applications 108 and 314 described above. The computing device may be configured to provide, through the web browser application 500, a web page 502.

In some embodiments, the web page 502 may be associated with a merchant. For example, the web page 502 may be an online retail web page through which a user of the computing device may engage in a purchase transaction to purchase a good from the merchant. In some embodiments, the web page may be provided by a merchant system, such as merchant system 114 described above. Other web pages are possible as well.

In some embodiments, as shown in FIG. 5A, a user of the computing device may be prompted to enter transaction data into one or more transaction fields 504, 506, and 508 on the web page 502. For example, during a "Checkout" stage of a purchase transaction, a user of the computing device may be prompted to enter "Billing Information" and "Shipping Information" into transaction fields 504, 506, and 508 on the web page 502. Other examples are possible as well. While certain transaction fields are shown, other transaction fields are possible as well.

In some embodiments, a browser extension server and/or a browser extension application executed at the computing device may execute a regular expression to detect at least one of transaction fields 504, 506, and 508. For example, the regular expression may be executed through the browser extension application to detect at least one of transaction fields 504, 506, and 508.

In some embodiments, the browser extension server and/or the browser extension application executed at the computing device may execute the regular expression to automatically populate the detected transaction field(s) with stored transaction data, as shown in FIG. 5B. For example, as shown, detected transaction fields 504 and 508 may be automatically populated with stored transaction data. In some embodiments the automatic population of a transaction field may involve populating the transaction field with text or another graphical indication representing the stored transaction data. For example, as shown, detected transaction field 504 may be automatically populated with text representing stored transaction data indicating a "Cardholder Name," while detected transaction field 508 may be automatically populated with text representing stored transaction data indicating a "Recipient Name." Other examples are possible as well.

In some embodiments, browser extension server and/or the browser extension application executed at the computing device may detect at least one unrecognized field. For example, as shown, transaction field 506 may be unrecognized. In response to detecting the unrecognized field, browser extension server and/or the browser extension application executed at the computing device may provide suggested transaction data 510. The suggested transaction data 510 may include, for example, stored transaction data, such as stored transaction data not used to automatically populate detected transaction fields 504 and 508. In some embodiments, providing the suggested transaction data 510 may involve providing an option for a user of the computing device to copy some or all of the suggested transaction data 510, as shown. The suggested transaction data 510 may be provided in other manners as well.

In some embodiments, browser extension server and/or the browser extension application executed at the computing device may detect manual population of the unrecognized field 506 with at least a portion of the suggested transaction data 510, as shown in FIG. 5C. In some embodiments, the manual population may include, for example, a user pasting the suggested transaction data 510 into the unrecognized field 506. Detecting the manual population may involve, for example, detecting which suggested transaction data 510 was populated into the unrecognized field 506. For example, detecting the manual population of unrecognized field 506 may involve detecting that the suggested transaction data 510 "78750" was pasted by the user into the unrecognized field 506 labeled "ZIP Code."

In some embodiments, a user may manually populate unrecognized field 506 without copying, pasting, and/or receiving from browser extension application any suggested transaction data. For example, in some embodiments, a user may manually populate unrecognized field 506 by typing text into and/or otherwise populating unrecognized field 506. Manual population may take other forms as well.

In some embodiments, browser extension server and/or the browser extension application executed at the computing device may, based on the manual population, recognize the unrecognized field 506. The unrecognized field 506 may be recognized based on, for example, the suggested transaction data 506 that was manually populated into the unrecognized field 506. For example, as shown, the suggested transaction data 510 manually populated into the unrecognized field 506 may be a ZIP code, and the unrecognized field 506 may be recognized to be a ZIP code field, which may, for example, be part of a shipping address. Other examples are possible as well. In some embodiments, the browser extension application executed at the computing device may provide an indication of the at least one unrecognized field 506 to the browser extension server.

While several example interfaces are shown in FIGS. 5A-5C, it will be understood that the interfaces shown are merely examples and that other interfaces are possible as well.

Figure 6:
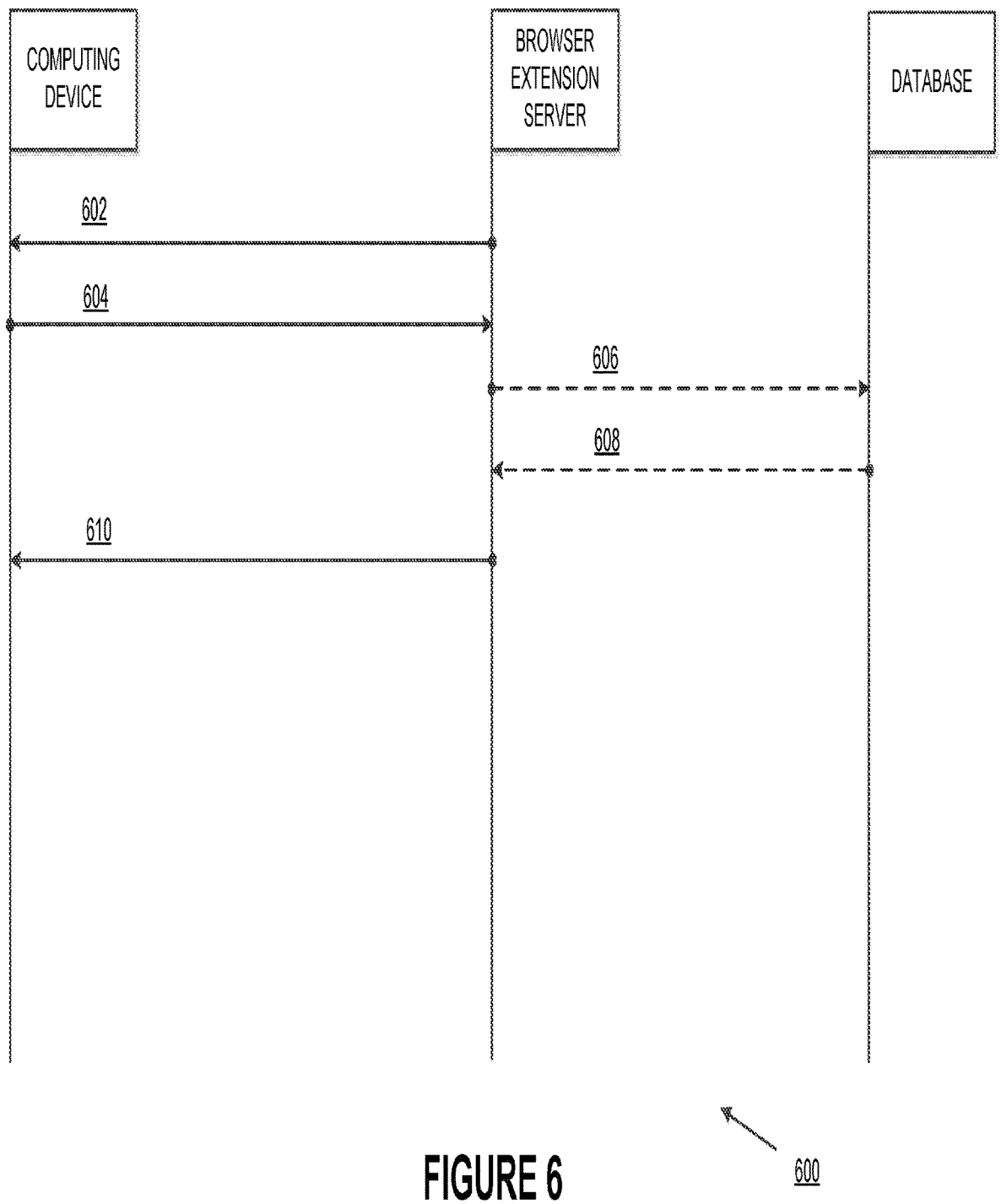
FIG. 6 is a flowchart of a browser extension message stream, consistent with disclosed embodiments.

FIG. 6 is a flowchart of a browser extension message stream 600, consistent with disclosed embodiments. It will be understood that messages in the browser extension message stream 600 are merely illustrative. Messages may be transmitted among the components and/or other components in other manners as well, and where a single message is shown, more messages are possible The computing device may, for example, be the same as or similar to computing devices 102 and 300 described above. In some embodiments, the computing device may be configured to execute a browser extension application, such as browser extension applications 106, 204, and 316 described above. The browser extension server may, for example, be the same as or similar to browser extension servers 110 and 202 described above.

In some embodiments, browser extension message stream 600 may include the browser extension server providing a regular expression to the computing device, as illustrated by message 602. The regular expression may be executed through the browser extension application at the computing device to detect and manually populate at least one transaction field in a web page.

In some embodiments, the browser extension application may detect at least one unrecognized field in the web page and, in response, the browser extension application may provide suggested transaction data to a user of the computing device. The browser extension application may detect manual population of the at least one unrecognized field and, based on the manual population, recognize the at least one unrecognized field. In some embodiments, browser extension message stream 600 may include the browser extension application providing to the browser extension server an indication of the at least one unrecognized field, as illustrated by message 604.

The browser extension server may be configured to generate an updated regular expression. Alternatively or additionally, in some embodiments, the browser extension server may generate the updated regular expression in connection with a database as shown. For example, the browser extension server may provide the indication to the database, as illustrated by message 606, and may receive the updated regular expression from the database, as illustrated by message 608. In some embodiments, browser extension message stream 600 may include providing the updated regular expression to the computing device, as illustrated by message 610.

In some embodiments, the updated regular expression may be generated using, in addition to the indication of the at least one transaction field, other information detected by the browser extension application. For example, the updated regular expression may be generated using indications of and/or programming language describing web page(s) and/or one or more additional elements in the web page(s).

Figure 7A:
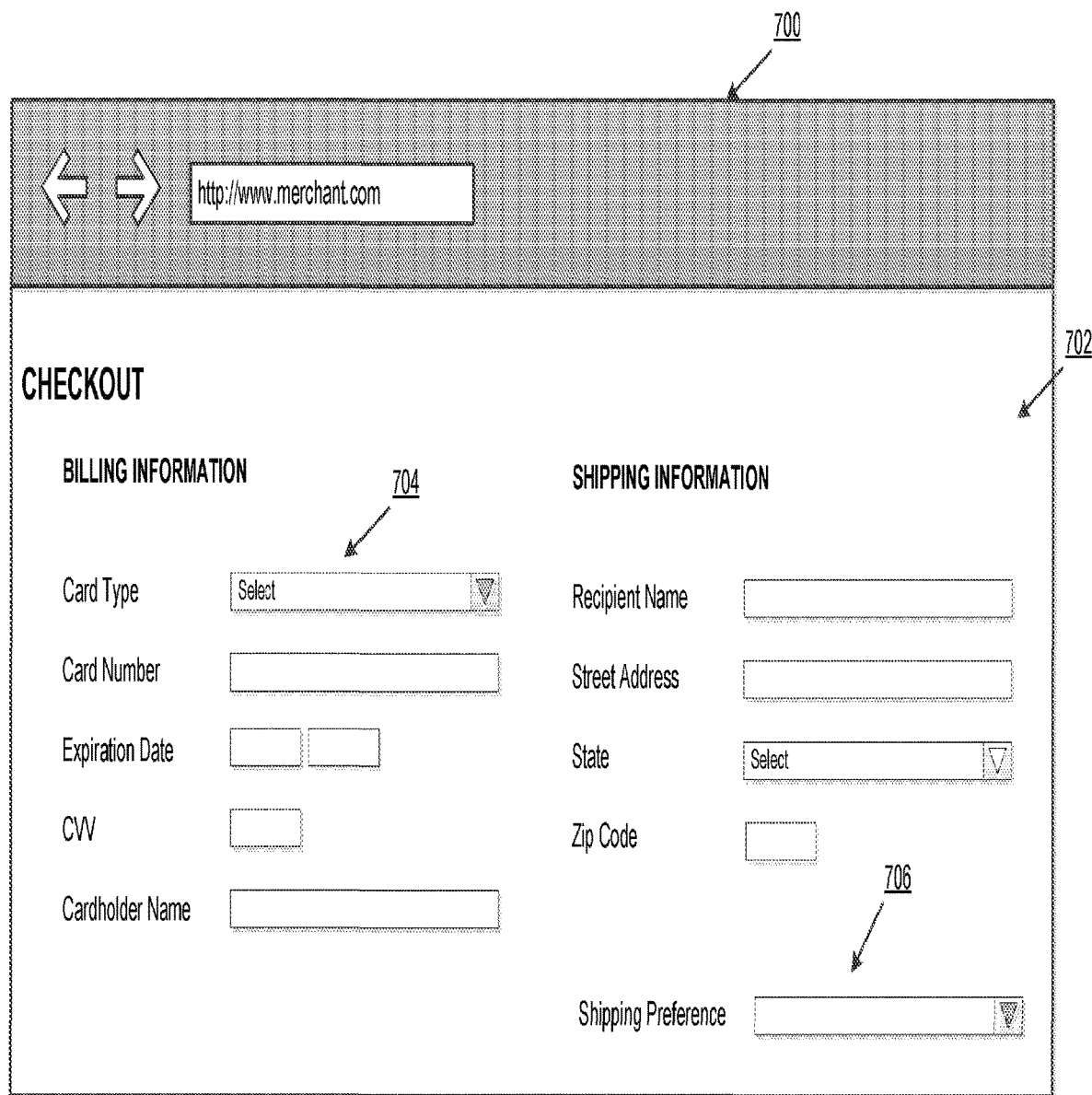
FIGS. 7A-7C illustrate exemplary interfaces including a merchant-provided payment process on computing devices, consistent with disclosed embodiments.
Figure 7B:
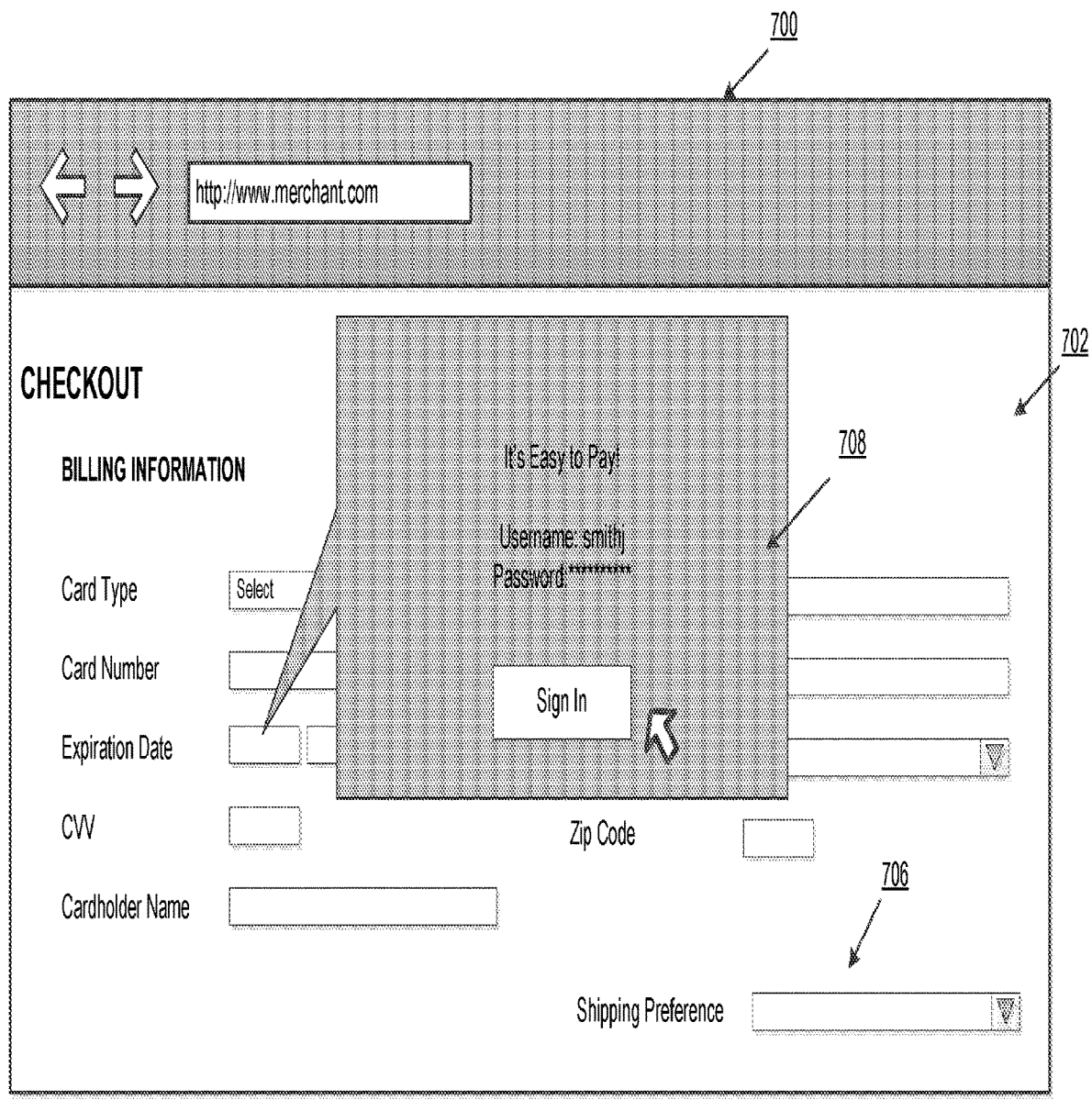
Figure 7C:
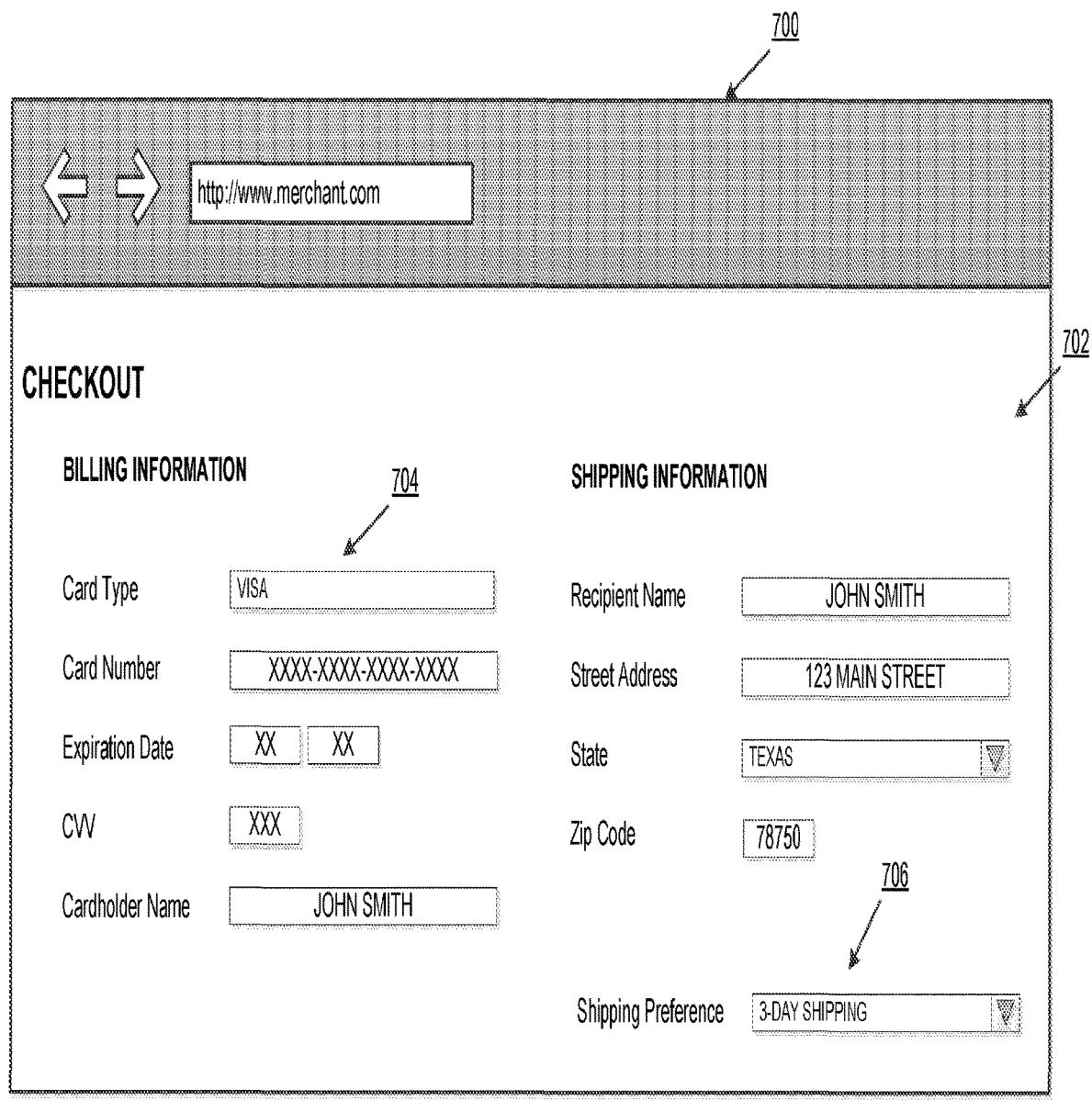

In some embodiments, the updated regular expression may be generated using information detected by the browser extension application during a merchant-provided payment process. FIGS. 7A-7C illustrate exemplary interfaces including a merchant-provided payment process on computing devices, consistent with disclosed embodiments. In some embodiments, as shown in FIG. 7A, a computing device, such as computing devices 102 and 300 described above, may be configured with a web browser application 700, such as web browser applications 108 and 314 described above. The computing device may be configured to provide, through the web browser application 700, a web page 702.

In some embodiments, the web page 702 may be associated with a merchant. For example, the web page 702 may be an online retail web page through which a user of the computing device may engage in a purchase transaction to purchase goods and/or services from the merchant. In some embodiments, the web page may be provided by a merchant system, such as merchant system 114 described above. Other web pages are possible as well.

In some embodiments, as shown in FIG. 7A, during a "Checkout" stage of a purchase transaction, a user of the computing device may be prompted to enter "Billing Information" and "Shipping information" into transaction fields 704 and 706 on the web page 702. While certain transaction fields are shown, other transaction fields are possible as well.

In some embodiments, the merchant associated with the web page 702 may provide a merchant-provided payment process, as shown in FIG. 7B. In some embodiments, the merchant-provided payment process may permit a user to engage in purchase transactions to purchase the merchant's goods or services. In some embodiments, the merchant-provided payment process may be provided by the merchant in connection with one or more financial service providers. As part of the merchant-provided payment process, the web page 702 may provide prompt a user to login to the merchant-provided payment process. For example, as shown, the web page 702 may include a pop-up notification 708. When a user logs into the merchant-provided payment process, the merchant-provided payment process may automatically populate at least one of transaction fields 704 and 706 in the web page 702, as shown in FIG. 7C.

In some embodiments, the merchant-provided payment process may involve transmission of messages or other information between the computing device providing the web page 702 and the merchant and/or financial service provider(s) providing the merchant-provided payment process. For example, the computing device and the merchant and/or financial service provider(s) may exchange request and/or get messages, such as hypertext transfer protocol (HTTP) POST messages. Other messages are possible as well. As an example, the merchant-provided payment process may involve transmission of a message that includes an indication of transaction fields 704 and/or 706.

In some embodiments, a browser extension application executed at the computing device may be configured to capture and/or review messages exchanged in connection with the merchant-provided payment process. In some embodiments, for example, the browser extension application may detect at least one additional transaction field in a message. For example, the browser extension application may detect transaction fields 704 and/or 706 in the message. In some embodiments, the browser extension application may provide, to the browser extension server, an indication of the transaction field(s) detected in the message, such as transaction fields 704 and/or 706. Alternatively or additionally, in some embodiments the browser extension application may provide to the browser extension server all or part of the message, e.g., in the programming language. In some embodiments, the browser extension server may generate an updated regular expression based, at least in part, on the indication of the transaction fields and/or the programming language of the message.

As noted above, in some embodiments a browser extension server may be configured to execute, through a browser extension application, a regular expression to detect and automatically populate transaction fields in a web page. In some embodiments, at least one of the detected transaction fields may be, for example, a payment field. In some embodiments, automatic population of a payment field may involve generation of a secure token, virtual account number, or other payment data.

While several exemplary interfaces are shown in FIGS. 7A-7C, it will be understood that the interfaces shown are merely examples and that other interfaces are possible as well.

Figure 8A:
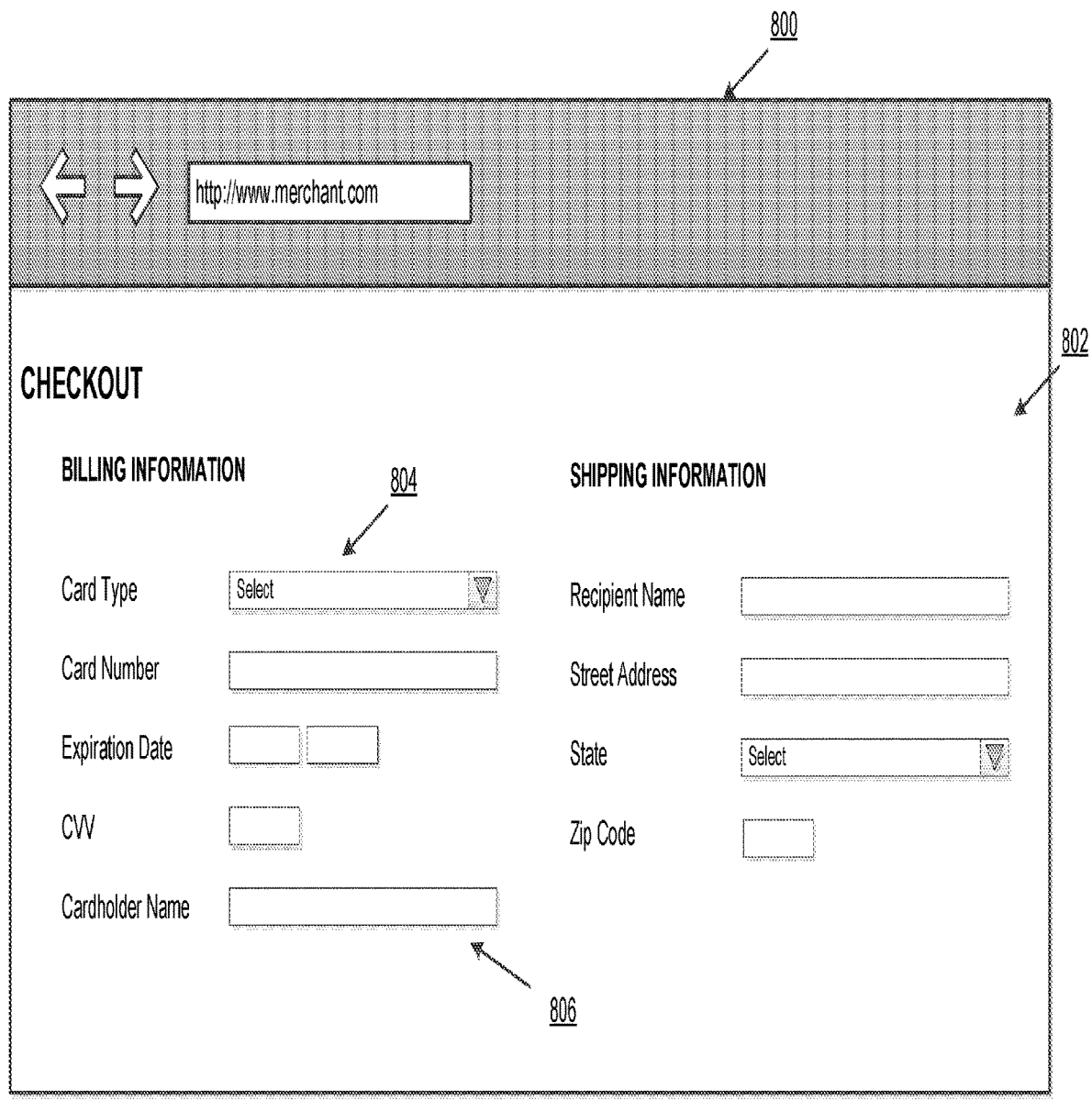
FIGS. 8A-8C illustrate exemplary interfaces including a secure token generation process on computing devices, consistent with disclosed embodiments.
Figure 8B:
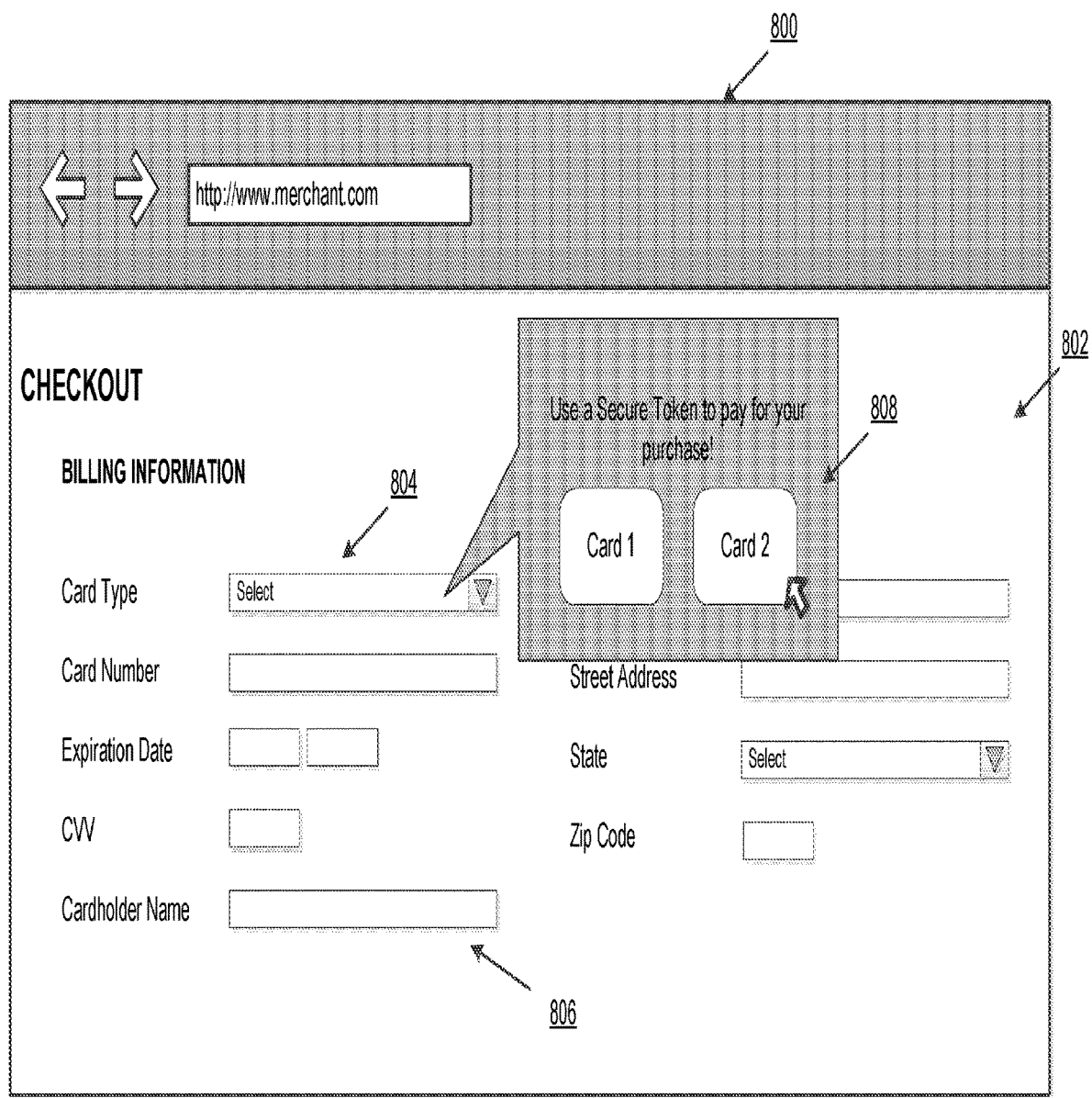
Figure 8C:
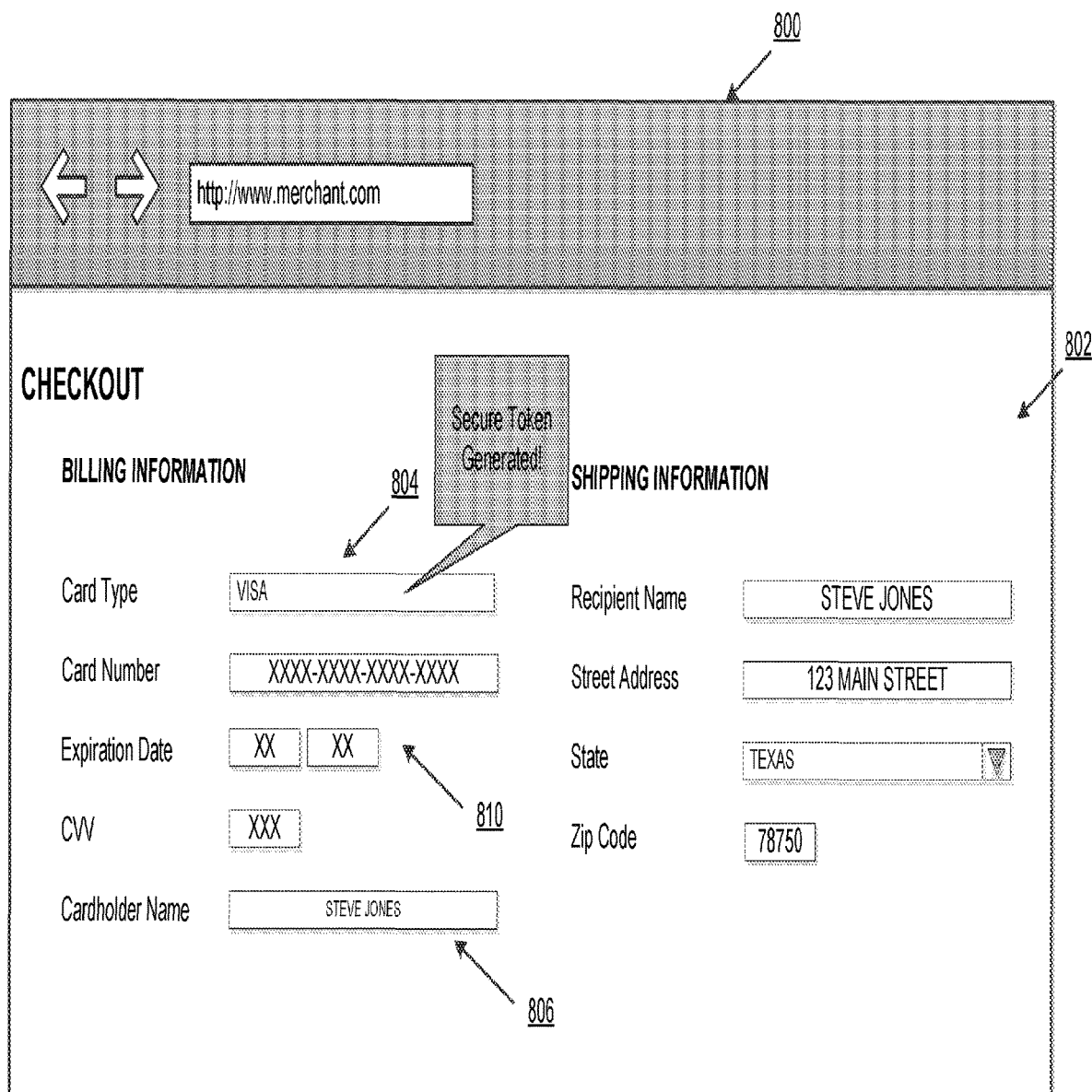

FIGS. 8A-8C illustrate exemplary interfaces including a secure token generation process on computing devices, consistent with disclosed embodiments. While a token is used for purposes of illustration, it will be understood that virtual account numbers and/or other payment data are possible as well. As shown in FIG. 8A, a computing device may execute a web browser application 800. In some embodiments, as shown in FIG. 8A, a computing device, such as computing devices 102 and 300 described above, may be configured with a web browser application 800, such as web browser applications 108 and 314 described above. The computing device may be configured to provide, through the web browser application 800, a web page 802. In some embodiments, the web page 802 may be associated with a merchant. For example, the web page 802 may be an online retail web page through which a user of the computing device may engage in a purchase transaction to purchase a good or service from the merchant. In some embodiments, the web page 802 may be provided by a merchant system, such as merchant system 114 described above. Other web pages are possible as well.

In some embodiments, as shown in FIG. 8A, during a "Checkout" stage of the purchase transaction, a user of the computing device may be prompted to enter "Billing Information" and "Shipping Information" into transaction fields on the web page 802. For example, the user may be prompted to enter payment information into transaction fields 804 and 808, as shown. While certain transaction fields are shown, other transaction fields are possible as well.

In some embodiments, using a regular expression, a browser extension server and/or a browser extension application executed at the computing device may detect and automatically populate the payment fields 804 and 806. In some embodiments, automatically populating one or more of transaction fields 804 and 806 may involve generate a secure token, as shown in FIGS. 8B-8C.

In some embodiments, the browser extension server and/or a browser extension application may provide to the user an offer to generate a secure token. For example, the browser extension application may provide a pop-up notification 808, as shown in FIG. 8B. The offer may be provided in other manners as well. In some embodiments, the offer may include, for example, an opportunity for a user of the computing device to select a financial service product (e.g., a credit card or debit card) or financial service account for which to create a secure token, as shown, in some embodiments, in response to receiving an acceptance of the offer from the user, the browser extension server may generate a secure token. Alternatively, in some embodiments, the browser extension server and/or computing device executing browser extension application may generate the secure token automatically, without providing an offer to or receiving an acceptance from the user. The secure token may be generated in other manners as well.

The secure token may be provided to the computing device, e.g., through the browser extension application. As shown in FIG. 8C, in some embodiments, the transaction field 804 in the web page 802 may be automatically populated with the secure token 810. For example, in some embodiments, the browser extension server may provide the secure token 810 to the browser extension application, and the browser extension application automatically populate the transaction field 804 with the secure token 810. The transaction field 804 may be populated in other manners as well. Transaction field 806 may be populated by the secure token 810 as well, manually by the user, or through a regular expression executed by the browser extension application, as described above.

In some embodiments, the computing device may provide the secure token 810 to effectuate a purchase transaction in which a user of the computing device purchases a good or service from the merchant providing the web page 802. In some embodiments, upon receiving the secure token 814, the merchant may seek authorization of the purchase transaction from a financial service provider by providing the secure token 810 to an FSP system, such as FSP system 112 described above, associated with the financial service provider. The financial service provider may use the secure token 810 to authenticate the computing device and authorize the purchase transaction.

While several example interfaces are shown in FIGS. 8A-8C, it will be understood that the interfaces shown are merely examples and that other interfaces are possible as well.

Figure 9:
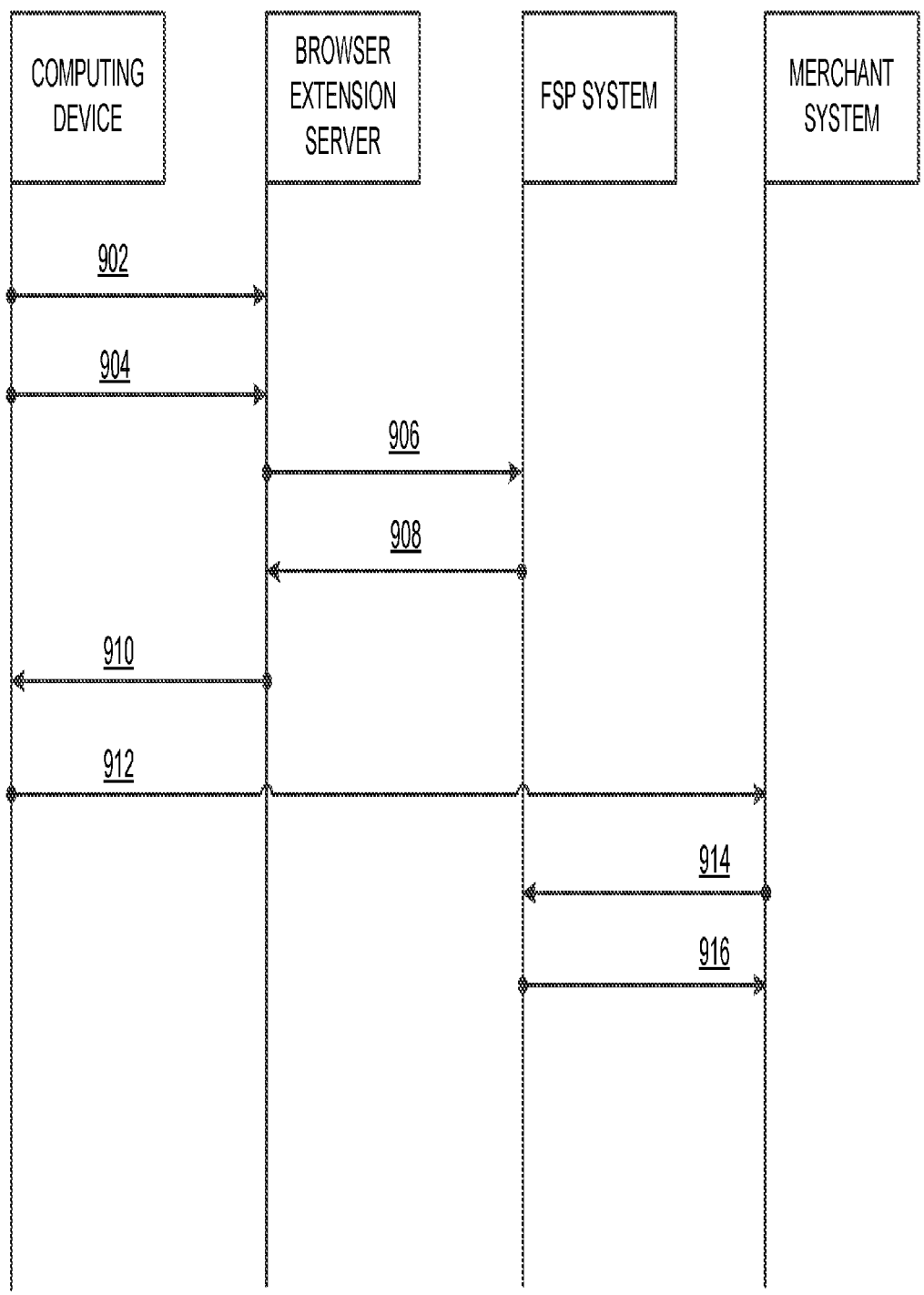
FIG. 9 is a flowchart of a browser extension message stream, consistent with disclosed embodiments.

FIG. 9 is a flowchart of a browser extension message stream 900, consistent with disclosed embodiments, it will be understood that messages in the browser extension message stream 900 are merely illustrative. Messages may be transmitted among the components and/or other components in other manners as well, and where a single message is shown, more messages are possible. The computing device, browser extension server, FSP system, and merchant system shown in FIG. 9 may be the same as or similar to, for example, computing devices 102 and 300, browser extension servers 110 and 202, FSP system 112, and merchant system 114, respectively.

As shown, the computing device may send a message 902 to the browser extension server. The message 902 may include, for example, an indication of a financial service account associated with the computing device. The indication of the financial service account may be, for example, a personal account number or PAN (e.g., a 16-digit PAN often printed on a financial service product), routing information, or other identifier of a financial service account. The indication of the financial service account may take other forms as well. In some embodiments, a user may operate the computing device to provide the indication such that a browser extension application and/or the browser extension server may subsequently coordinate with the FSP system to generate and provide a secure token mapped to the underlying financial service account, as described below. While a token is used for purposes of illustration, it will be understood that a virtual account number and/or other payment data are possible as well.

Thereafter, the computing device may send a message 904 to the browser extension server. The message 904 may indicate, for example, a transaction field in a web page, such as an online retail web page through which a user of the computing device may engage in a purchase transaction to purchase goods or services from a merchant associated with the merchant system.

Through messages 906 and 908, browser extension server and/or the FSP system may generate a secure token. The FSP system may, for example, be associated with a financial service provider that provides the financial service account associated with the computing device.

With message 910, browser extension server may provide the secure token to the computing device. In some embodiments, the payment field may be automatically populated with the secure token.

The computing device may send the secure token to the merchant system through message 912. For example, the computing device may provide the secure token to effectuate a purchase transaction to purchase goods or services from the merchant associated with the merchant system.

To complete the purchase transaction, the merchant system and the FSP system may authorize the purchase transaction through messages 914 and 916. For example, the merchant system may provide the secure token to the FSP system with message 914, and the FSP system may provide an authorization and/or payment to the merchant system through message 916.

In some embodiments, the secure token may map directly (that is, without any intermediary) to the financial service account. In these embodiments, when the secure token is provided to the merchant, the merchant may receive payment directly from the financial service account, rather than from any intermediary. Such direct mapping may enable return processing. For example, where a good was purchased from a merchant during a purchase transaction involving a secure token, when the good is returned the payment made for the good may be returned directly to the financial service account by the merchant. Other examples are possible as well.

In some embodiments, the disclosed browser extension server and/or computing device executing browser extension application may provide additional functionalities. For example, in some embodiments, the browser extension server and/or computing device executing browser extension application may be configured to provide real-time, user-targeted coupons for use in purchase transactions. For example, a computing device may provide, through a web browser application, web pages associated with merchants. As the user browses the web pages, the browser extension application may detect and store data describing the user's browsing history including, for example, whether the user has visited and/or made purchases on merchants' web pages. In some embodiments, the browser extension application may be associated with and/or may have access to data gathered by a financial service provider. The data gathered by the financial service provider may describe the user's purchasing history, including, for example, at which merchants the user has made purchases, when and/or how often the user has made purchases at the merchants, and/or an amount of money the user has spent at the merchants.

Based on the user's browsing history and purchasing history, the browser extension server and/or computing device executing browser extension application, either alone or in connection with the financial service provider, may generate and provide to the user real-time, user-targeted coupons. For example, based on the user's browsing history and purchasing history, a coupon for use at a merchant may be generated. When the user visits the merchant's web page, the coupon may be provided to the user by the browser extension application.

In some embodiments, the browser extension server and/or computing device executing browser extension application may be configured to collect information that enables the financial service provider and/or the merchant to track usage of the real-time, user-targeted coupons. For example, in some embodiments, when the user uses a coupon at a merchant's web page, the browser extension application may detect a "receipt" or "confirmation" page concluding a purchase transaction at the web page. In some embodiments, the browser extension application may capture a "snapshot" of the page, from which the browser extension application and/or browser extension server may detect Stock Keeping Unit (SKU) data identifying a good or service purchased from the merchant, a timestamp for the purchase transaction, a method of payment used for the purchase transaction, and any coupons used in the purchase transaction. The browser extension application may detect other information as well. In some embodiments, the browser extension application may provide the information to the financial service provider.

The financial service provider may be configured to determine, based on the information collected by the browser extension application, usage information describing usage of the real-time, user-targeted coupons. For example, the financial service provider may determine which user was provided the coupon, which user presented the coupon during the purchase transaction, and which goods or services were purchased using the coupon. In some embodiments, the financial service provider may further determine, based on the information collected by the browser extension application, which goods or services the user has purchased from the merchant's web page, when and/or how often the user has made purchases at the merchant's web page, and/or an amount of money the user has spent at the merchant's web page. In some embodiments, the financial service provider may be configured to provide some or all of the determined usage information to the merchant for use by the merchant. The determined usage information may be provided to the merchant as, for example, a dashboard or other interactive display through which the merchant may access the determined usage information. The determined usage information may be provided in other manners as well.

In some embodiments, the determined usage information may be determined by the merchant to, for example, verify real-time, user-targeted coupons. For example, when a user presents a coupon to the merchant, the merchant may determine, based on the determined usage information, whether the coupon has previously been presented to the merchant, if not, the coupon may be verified.

Figure 10:
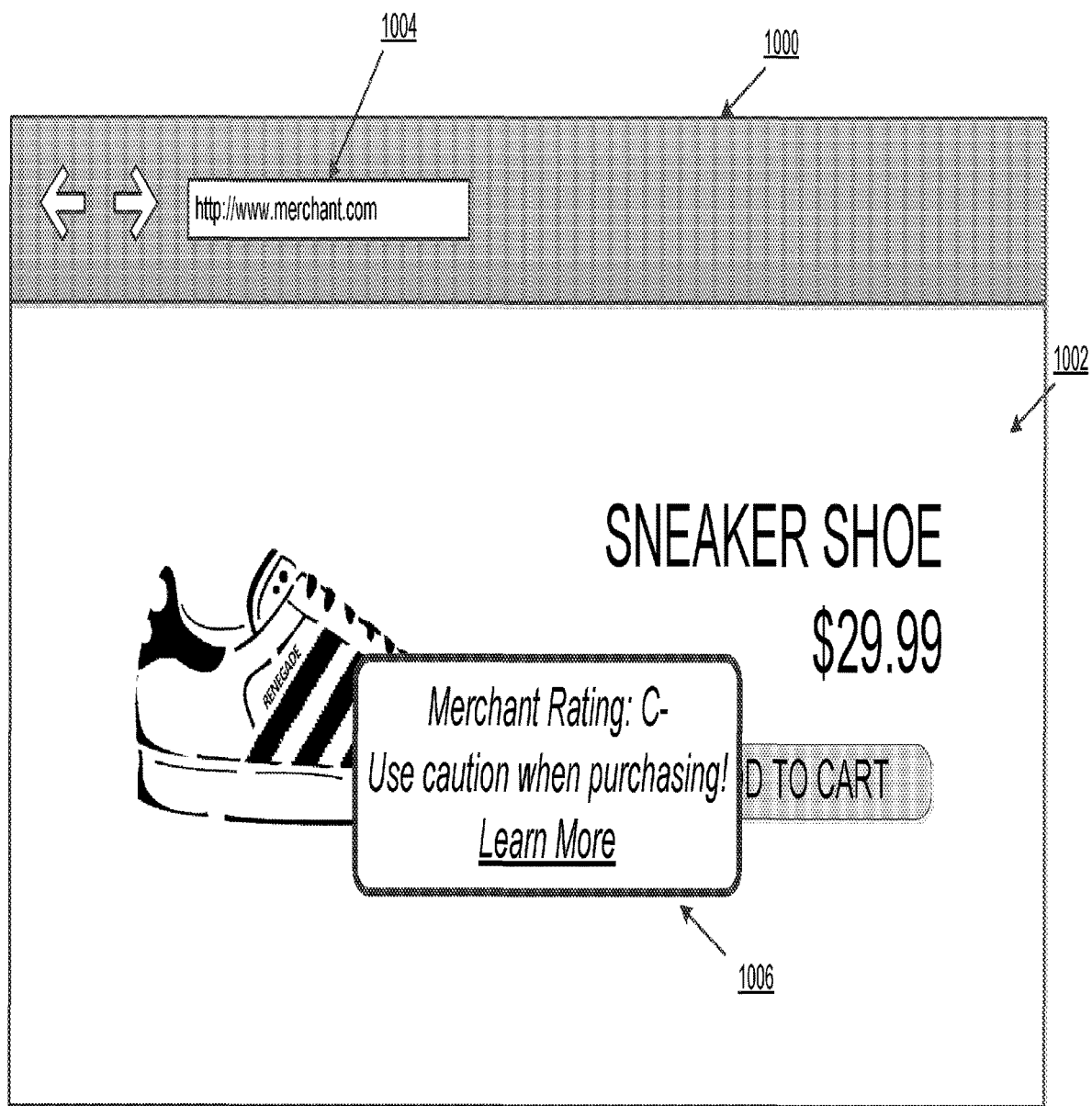
FIG. 10 illustrates an exemplary interface including a merchant rating process on computing devices, consistent with disclosed embodiments.

Another functionality that may be provided by the disclosed browser extension server and/or computing device executing browser extension application may be merchant rating. FIG. 10 illustrates an exemplary interface 1000 including a merchant rating process on computing devices, consistent with disclosed embodiments.

In some embodiments, the browser extension application may be configured, when a user visits a web page 1002 associated with a merchant, to provide the web address 1004 (e.g., uniform resource locator) to the browser extension server. The browser extension server and/or database may maintain merchant identifiers associated with web addresses. In some embodiments, the merchant identifiers may be associated with the web addresses based on, for example, prior purchase transactions. For example, when a purchase transaction occurs at the web page 1002, the merchant identifier may be determined based on the purchase transaction and associated with the web address 1004 in the browser extension server and/or database.

The browser extension server and/or another database may additionally maintain, for each merchant identifier, purchase transaction data for purchases made at the merchant. The purchase transaction data may be any data indicating whether the merchant is a safe, reliable merchant at which to make purchases. The purchase transaction data may include, for example, data regarding disputes, returns, fraud claims, and/or repeat purchases made at the merchant. Other purchase transaction data is possible as well. In some embodiments, the browser extension server and/or database may further include and/or have access to merchant data from one or more other sources, such as the Better Business Bureau® or another consumer organization, one or more security providers, or another source. In some embodiments, based on the purchase transaction data and/or merchant data, each merchant may be rated according to how safe and reliable the merchant is. For example, the merchant may be given a rating of positive, negative, or neutral. Other ratings are possible as well. In some embodiments, the ratings may be based on a comparative analysis across similar merchants (e.g., as determined based on merchant category codes, institutional knowledge, and/or external data on merchant categorizations). In some embodiments, a merchant may have a rating for each of a number of categories, such as a dispute category, a return category, a repeat purchases category, and a fraud category. Other categories are possible as well. In some embodiments, the browser extension server, the database, and/or another entity may employ predictive modeling to determine a rating for each merchant based on aggregated assessments of a plurality of merchants and web pages.

In response to receiving the web address 1004 from the browser extension application, the browser extension server and/or database may search for a merchant identifier associated with the web address 1004 and provide the purchase transaction data and/or the merchant data for the merchant identifier to the browser extension application. Based on the purchase transaction data and/or the merchant data, the browser extension application may provide, in the web page 1002, an indication of whether the merchant is a safe and reliable merchant at which to make purchases. The indication may take the form of, for example, a pop-up notification 1006 in the web page 1002. Other indications are possible as well. In some embodiments, the browser extension application may be further configured to relay messages from the merchant to the user. The messages may take the form of, for example, pop-up notifications in the web page 1002. Other messages are possible as well.

Yet another functionality that may be provided by the disclosed browser extension server and/or computing device executing browser extension application is a cross-process functionality. Some web pages may provide a process within the web page. For example, some web pages associated with merchants may provide a merchant-provided payment process within the web page. Other processes are possible as well.

A user may complete a registration process with the browser extension application in which the user provides login credentials, preferences, and other information, such as payment information or shipping information, associated with the user. When a user logs in to the browser extension application, the browser extension application may provide the login credentials, preferences, and other information to the browser extension server, and the browser extension server may maintain a login state for the user.

When the user visits a web page providing a process in which the user wishes to partake, the browser extension application may instruct the web page to request the user's login credentials from the browser extension server. When the web page requests the user's login credentials from the browser extension, the browser extension server may respond to the web page that the user is already logged in, based on the maintained login state. Further, the browser extension server may provide the preferences and/or other information to the web page for use in the process. For example, if the process is a merchant-provided payment process, the browser extension server may provide payment information and/or shipping information to the web page for use in the merchant-provided payment process.

In some embodiments, the browser extension application may enhance security of the process provided by the web page by requiring authentication of the user through a computing device other than the computing device on which the web page is displayed. For example, a user may be required to provide authenticating information, such as a fingerprint, to another computing device, such as a mobile device, before the process is carried out. Other examples are possible as well.

Still another functionality that may be provided by the disclosed browser extension server and/or computing device executing browser extension application is a transaction history. In some embodiments, the browser extension application may maintain a transaction history detailing purchase transactions made by a user. In some embodiments, each purchase transaction may identify a secure token generated for the purchase transaction.

Another functionality that may be provided by the disclosed browser extension server and/or computing device executing the browser extension application is notifications. In some embodiments, the browser extension application may be configured to provide a user with a notification, such as a pop-up notification in a web page, each time a purchase transaction is completed, whether in a web page at the computing device, at another computing device, or in a physical merchant. Alternatively or additionally, in some embodiments, the browser extension application may be configured to provide a user with a notification, such as a pop-up notification in a web page, each time a secure token is generated. In some embodiments, the browser extension application may be associated with a financial service provider, and the financial service provider may notify the browser extension application of each purchase transaction as it is completed and/or each secure token as it is generated. The browser extension server and/or computing device executing the browser extension application may provide additional functionalities as well.

In some embodiments, various features of the browser extension system may be activated, deactivated, and/or customized through a browser extension application control panel. For example, such a control panel may enable a user to provide indications of financial service accounts associated with the user, including a default financial service account, and manage existing secure tokens. As another example, such a control panel may enable a user to add special occasions and reminders for friends and/or family, generate a secure token to share with friends and/or family, turn on or off notifications within the browser extension application, turn on or off functionalities of the browser extension server and/or computing device executing the browser extension application, and turn on or off availability of the browser extension application in certain computing devices. Other examples are possible as well.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system for executing a browser extension application comprising:
one or more processors programmed with instructions that, when executed by the one or more processors, cause operations comprising:
detecting a transaction field in a web page based on one or more patterns received from a browser extension server system;
receiving, from the browser extension server system, a token associated with the detected transaction field;
automatically populating the detected transaction field with the token;
detecting an unrecognized field in the web page;
in response to detecting the unrecognized field, providing suggested transaction data;
detecting a selection of at least a portion of the suggested transaction data to populate the unrecognized field; and
providing, to the browser extension server system, an indication of the selection of the suggested transaction data.

2. The system of claim 1, the operations further comprising:
in response to detecting the unrecognized field, providing, to the browser extension server system, a message indicating a programming language of the web page; and
in response to providing the message indicating the programming language of the web page, receiving one or more updated patterns from the browser extension server system, the one or more updated patterns being generated by the browser extension server system based on the programming language of the web page.

3. The system of claim 1, the operations further comprising:
in response to detecting the unrecognized field, providing, to the browser extension server system, a message indicating the unrecognized field; and
in response to providing the message indicating the unrecognized field, receiving one or more updated patterns from the browser extension server system, the one or more updated patterns being generated by the browser extension server system based on the unrecognized field.

4. The system of claim 1, wherein the suggested transaction data is received from the browser extension server system.

5. The system of claim 1, wherein the one or more patterns received from the browser extension server system comprises a regular expression configured to detect a plurality of fields in the web page, the operations further comprising:
executing the regular expression received from the browser extension server system against web page data associated with the unrecognized field,
wherein detecting the unrecognized field comprises identifying the unrecognized field as unrecognized based on the execution of the regular expression.

6. The system of claim 1, wherein the transaction field comprises a payment field.

7. A method comprising:
    detecting a transaction field in a web page;
    receiving, from a server system, a token associated with the detected transaction field;
    automatically populating the detected transaction field with the token;
    detecting an unrecognized field in the web page;
    providing suggested transaction data based on the detection of the unrecognized field;
    detecting a selection of at least a portion of the suggested transaction data to populate the unrecognized field; and
    providing, to the server system, an indication of the selection of the suggested transaction data.

8. The method of claim 7, further comprising:
    providing, to the server system, based on the detection of the unrecognized field, a message indicating a programming language of the web page; and
    receiving, from the server system, one or more updated patterns configured to detect the unrecognized field, the one or more updated patterns being generated by the server system based on the programming language of the web page.

9. The method of claim 7, further comprising:
    providing, to the server system, based on the detection of the unrecognized field, a message indicating the unrecognized field; and
    receiving, from the server system, one or more updated patterns configured to detect the unrecognized field, the one or more updated patterns being generated by the server system based on the unrecognized field.

10. The method of claim 7, wherein the suggested transaction data is received from the server system.

11. The method of claim 7, further comprising:
    receiving, from the server system, a regular expression configured to detect a plurality of fields in the web page; and
    executing the regular expression received from the server system against web page data associated with the unrecognized field,
    wherein detecting the unrecognized field comprises identifying the unrecognized field as unrecognized based on the execution of the regular expression.

12. The method of claim 7, wherein the transaction field comprises a payment field.

13. One or more non-transitory computer-readable media storing instructions that, when executed by one or more processors, cause operations comprising:
    detecting a transaction field in a web page;
    receiving, from a server system, a token associated with the detected transaction field;
    automatically populating the detected transaction field with the token;
    detecting an unrecognized field in the web page;
    providing suggested transaction data based on the detection of the unrecognized field;
    detecting a selection of at least a portion of the suggested transaction data to populate the unrecognized field; and
    providing, to the server system, an indication of the selection of the suggested transaction data.

14. The non-transitory computer-readable media of claim 13, the operations further comprising:
    providing, to the server system, based on the detection of the unrecognized field, a message indicating a programming language of the web page; and
    receiving, from the server system, one or more updated patterns configured to detect the unrecognized field, the one or more updated patterns being generated by the server system based on the programming language of the web page.

15. The non-transitory computer-readable media of claim 13, the operations further comprising:
    providing, to the server system, based on the detection of the unrecognized field, a message indicating the unrecognized field; and
    receiving, from the server system, one or more updated patterns configured to detect the unrecognized field, the one or more updated patterns being generated by the server system based on the unrecognized field.

16. The non-transitory computer-readable media of claim 13, wherein the suggested transaction data is received from the server system.

17. The non-transitory computer-readable media of claim 13, the operations further comprising:
    receiving, from the server system, a regular expression configured to detect a plurality of fields in the web page; and
    executing the regular expression received from the server system against web page data associated with the unrecognized field,
    wherein detecting the unrecognized field comprises identifying the unrecognized field as unrecognized based on the execution of the regular expression.

18. The non-transitory computer-readable media of claim 13, wherein detecting the transaction field in the web page comprises detecting the transaction field in the web page based on one or more patterns received from the server system.

19. The non-transitory computer-readable media of claim 13, wherein the web page comprises a merchant-provided payment process, the merchant-provided payment process comprising a given message, the operations further comprising:
    providing, to the server system, an indication of an additional transaction field detected in the given message.

20. The non-transitory computer-readable media of claim 13, wherein the transaction field comprises a payment field.

* * * * *